US009645877B2

(12) United States Patent
Wada et al.

(10) Patent No.: US 9,645,877 B2
(45) Date of Patent: May 9, 2017

(54) MONITORING APPARATUS, MONITORING METHOD, AND RECORDING MEDIUM

(71) Applicant: Hitachi, Ltd., Tokyo (JP)

(72) Inventors: Kiyomi Wada, Tokyo (JP); Mineyoshi Masuda, Tokyo (JP); Yutaka Kudo, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 111 days.

(21) Appl. No.: 14/763,957

(22) PCT Filed: Aug. 21, 2013

(86) PCT No.: PCT/JP2013/072276
§ 371 (c)(1),
(2) Date: Jul. 28, 2015

(87) PCT Pub. No.: WO2015/025379
PCT Pub. Date: Feb. 26, 2015

(65) Prior Publication Data
US 2015/0370623 A1 Dec. 24, 2015

(51) Int. Cl.
*G06F 11/34* (2006.01)
*G06F 11/07* (2006.01)
*G06F 11/32* (2006.01)

(52) U.S. Cl.
CPC ........ *G06F 11/079* (2013.01); *G06F 11/0721* (2013.01); *G06F 11/0745* (2013.01); *G06F 11/32* (2013.01); *G06F 11/3419* (2013.01)

(58) Field of Classification Search
CPC .. G06F 11/3065; G06F 11/34; G06F 11/3419; G06F 11/3466

USPC .................................................... 714/37, 45
See application file for complete search history.

(56) References Cited

U.S. PATENT DOCUMENTS

| 2004/0039968 | A1* | 2/2004 | Hatonen | G06K 9/6284 |
| | | | | 714/39 |
| 2006/0029016 | A1* | 2/2006 | Peles | H04L 43/022 |
| | | | | 370/328 |
| 2006/0277230 | A1 | 12/2006 | Nishizawa et al. | |
| 2007/0260589 | A1 | 11/2007 | Yugami | |

(Continued)

FOREIGN PATENT DOCUMENTS

| JP | 2006-338432 A | 12/2006 |
| JP | 4616791 B2 | 1/2011 |

OTHER PUBLICATIONS

International Search Report of PCT/JP2013/072276.

*Primary Examiner* — Chae Ko
(74) *Attorney, Agent, or Firm* — Mattingly & Malur, PC

(57) ABSTRACT

Monitoring apparatus is configured to execute: obtaining pieces of information about access in a first time slot by specifying the first time slot including access to a first apparatus in the system where a response time is long; selecting a feature common to the access in the first time slot from the pieces of information about the access in the first time slot that have been obtained; first extracting from pieces of information about access in a given period of time, pieces of information about access that has the common feature selected as a feature common to the access in the first time slot; and first generating a first graph which shows changes with time in response time, based on the pieces of information about the access having the feature common to the access in the first time slot that have been extracted.

9 Claims, 24 Drawing Sheets

(56) References Cited

U.S. PATENT DOCUMENTS

| | | | |
|---|---|---|---|
| 2007/0263541 A1* | 11/2007 | Cobb | H04L 12/2602 |
| | | | 370/235 |
| 2008/0228914 A1* | 9/2008 | Ofel | H04L 12/2697 |
| | | | 709/224 |
| 2008/0250128 A1* | 10/2008 | Sargent | H04L 41/22 |
| | | | 709/223 |
| 2008/0256146 A1 | 10/2008 | Nishizawa et al. | |
| 2010/0031354 A1* | 2/2010 | Hudis | G06F 21/55 |
| | | | 726/22 |
| 2016/0218942 A1* | 7/2016 | Choquette | H04L 43/0811 |

* cited by examiner

Fig. 6

| TIME 601 | SERVICE GROUP NAME 602 | SERVICE INFORMATION 603 | PAGE INFORMATION 604 | REQUEST INFORMATION 605 | | | | | RESPONSE INFORMATION 606 | | RESPONSE TIME 607 |
|---|---|---|---|---|---|---|---|---|---|---|---|
| | | | | SOURCE IP ADDRESS 605a | METHOD 605b | URL PATH 605c | URL QUERY 605d | | HTTP STATUS 606a | TRANSFER DATA AMOUNT 606b | |
| '12/07/30 15:21:ss | | | | | | http://somesite.com/web/search | ?q={query}& k=all | | 200 | 500MB | 8.0 SECONDS |

| TIME | SERVICE GROUP NAME | SERVICE INFORMATION 603 | | PAGE INFORMATION 604 | | ACCESS PERFORMANCE INFORMATION 700 | | |
|---|---|---|---|---|---|---|---|---|
| 601 | 602 507 | SERVICE NAME 603a | URI 603b | PAGE NAME 604a | URL 604b | RESPONSE INFORMATION 606 | | RESPONSE TIME 607 |
| | | | | | | HTTP STATUS | TRANSFER DATA AMOUNT | |
| '12/07/30 15:21:ss | ORDER TAKING/ PLACING SERVICE | SERVICE 1 | | | | | | 8.0 SECONDS |

Fig. 8

| TIME | SERVICE GROUP NAME | SERVICE INFORMATION 509 || PAGE INFORMATION 604 || ACCESS DETAILS INFORMATION 800 |||||||
|---|---|---|---|---|---|---|---|---|---|---|---|
| 601 | 602 | 603 ||| | REQUEST INFORMATION 605 |||| RESPONSE INFORMATION 606 || 607 |
| | | SERVICE NAME | URI | PAGE NAME | URL | SOURCE IP ADDRESS | METHOD | URL RELATIVE PATH | URL RELATIVE QUERY | HTTP STATUS | TRANSFER DATA AMOUNT | RESPONSE TIME |
| '12/07/30 15:21:ss | ORDER TAKING/ PLACING SERVICE | SERVICE 1 | | | | | | | | | | 8.0 SECONDS |

Fig. 12

| 601 | 1002 | 602 | 1105a 603 | 604 | 1201 | 1202 | 1203 | 1204 |
|---|---|---|---|---|---|---|---|---|
| TIME | BUSINESS OPERATION NAME | SERVICE GROUP NAME | SERVICE INFORMATION | PAGE INFORMATION | DETERMINATION | RESPONSE TIME/MIN. (STATISTICAL VALUE) | THROUGHPUT /MIN. (CUMULATIVE VALUE) | ERROR RATE/MIN (CUMULATIVE VALUE) |

Fig. 13

| TIME 601 | BUSINESS OPERATION NAME 1002 | SERVICE GROUP NAME 602 | SERVICE INFORMATION 908a 603 | | PAGE INFORMATION 604 | | DETER-MINATION 1201 | RESPONSE TIME/MIN. (STATISTICAL VALUE) 1202 | | | | THROUGH-PUT/MIN. (CUMU-LATIVE VALUE) 1203 | ERROR RATE/MIN. (CUMU-LATIVE VALUE) 1204 |
|---|---|---|---|---|---|---|---|---|---|---|---|---|---|
| | | | SERVICE NAME | URI | PAGE NAME | URL | | AVERAGE | MINIMUM | MAXIMUM | VARIANCE | | |
| '12/07/31 15:20 | ORDER TAKING/ PLACING BUSINESS OPERATION | ORDER TAKING/ PLACING SERVICE | | | | | NORMAL | 3.0 | 1.0 | 5.0 | σ | 100 | 0 |
| '12/07/31 15:21 | | | | | | | NORMAL | 5.0 | 3.0 | 8.0 | σ | 10 | 0 |

Fig. 14

| TIME (601) | BUSINESS OPERATION NAME (1002) | SERVICE GROUP NAME (602) | SERVICE INFORMATION (603) | | PAGE INFORMATION (604) | | ACCESS DETAILS INFORMATION (800) | | | | | | RESPONSE TIME (607) |
|---|---|---|---|---|---|---|---|---|---|---|---|---|---|
| | | | | | | | REQUEST INFORMATION (605) | | | | RESPONSE INFORMATION (606) | | |
| | | | SERVICE NAME | URI | PAGE NAME | URL | SOURCE IP ADDRESS | METHOD | URL RELATIVE PATH | URL RELATIVE QUERY | HTTP STATUS | TRANSFER DATA AMOUNT | |
| '12/07/30 15:21:ss | ORDER TAKING/ PLACING BUSINESS OPERATION | ORDER TAKING/ PLACING SERVICE | SERVICE 1 | | | | | | | | | | 8.0 SECONDS |

| TIME | BUSINESS OPERATION NAME | SYSTEM NAME | HOST INFORMATION | AGENT NAME | METRIC | PERFORMANCE VALUE | DETERMINATION |
|---|---|---|---|---|---|---|---|
| 601 | 1002 | 1004 | 1105b / 1005 | 1006 | 1007 | 1501 | 1502 |

Fig. 16

| 601 TIME | 1002 BUSINESS OPERATION NAME | 1004 SYSTEM NAME | 1005 HOST INFORMATION | | 1006 AGENT NAME | 1007 METRIC | | 1501 PERFORMANCE VALUE | 1502 DETERMINATION |
|---|---|---|---|---|---|---|---|---|---|
| | | | 1005a HOST NAME | 1005b IP ADDRESS | | 1007a RECORD NAME | 1007b FIELD NAME | | |
| '12/07/31 15:21 | ORDER TAKING/ PLACING BUSINESS OPERATION | SALES MANAGEMENT SYSTEM | SERVER 1 | 133.144.1.5 | WINDOWS MONITORING | CPU | UTILIZATION RATIO | 70% | NORMAL |
| | | | | | | MEMORY | UTILIZATION RATIO | 60% | NORMAL |
| | | | | | | DISK IO | UTILIZATION RATIO | 40% | NORMAL |

| 601 | 1002 | 1004 | 1005 HOST INFORMATION | | 1006 | 1008 SQL INFORMATION | | | 1702 |
|---|---|---|---|---|---|---|---|---|---|
| | | | 1005a | 1005b | | 1008a | 1008b | 1008c | |
| TIME | BUSINESS OPERATION NAME | SYSTEM NAME | HOST NAME | IP ADDRESS | AGENT NAME | SQL_ID | HASH VALUE | SQL TEXT | EXECUTION TIME |
| '12/07/31 15:21 | ORDER TAKING/ PLACING BUSINESS OPERATION | SALES MANAGEMENT SYSTEM | SERVER 1 | 133.144.1.5 | SQL MONITORING | | | | 1.5 |

1700, 1701

MONITORING APPARATUS, MONITORING METHOD, AND RECORDING MEDIUM

BACKGROUND OF THE INVENTION

This invention relates to a monitoring apparatus for monitoring a system, a monitoring method, and a recording medium.

Japanese Patent No. 4616791 is about a technology for identifying requests that are transmitted/received among a plurality of servers in a Web 3-tier system as a transaction in which the requests are grouped in a series of processing units. Specifically, in Japanese Patent No. 4616791, log information inside a server of a management target system is collected in order to analyze past access history and find out a pattern from a call relation between requests, and requests having the same pattern are grouped together. A service performance failure investigation based on Japanese Patent No. 4616791 identifies the cause of a performance failure by investigating for each type of grouped requests the trend of response performance and the internal processing time within the transaction. Japanese Patent No. 4616791 thus uses users' access history which amounts to a large quantity to assist in investigating the cause of a service performance failure that has occurred. A stream data processing system of Japanese Patent Application Laid-open No. 2006-338432 processes, in real time, stream data which flows in by the minute.

The related-art described above, however, is incapable of detecting a performance failure early before an end user notices a service utilization failure, and takes long to trace the cause of the performance failure, which results in a delay in taking action. In addition, the related-art described above requires a management target server to contain a mechanism for measuring the internal processing time within a transaction and keeping the measured time as log information. A problem thereof is that installing the mechanism in a management target server consumes labor and time. There are also other problems such as a fear of affecting other applications, overhead for measuring the internal processing time for every transaction at the time of execution, and the securement of a storage area for keeping the log information.

SUMMARY OF THE INVENTION

An object of this invention is to make the narrowing down of the cause of a failure efficient.

An aspect of the invention disclosed in this application is a monitoring apparatus, a monitoring method, and a recording medium including: a processor for executing a program; a memory for storing the program that is executed by the processor; and an interface for controlling communication between the monitoring apparatus and the system, wherein the processor is configured to execute: obtaining pieces of information about access in a first time slot by specifying the first time slot including access to a first apparatus in the system where a response time is long; selecting a feature common to the access in the first time slot from the pieces of information about the access in the first time slot that have been obtained at the obtaining; first extracting, from pieces of information about access in a given period of time, pieces of information about access that has the common feature selected in the selection step as a feature common to the access in the first time slot; and generating a first graph which shows changes with time in response time, based on the pieces of information about the access having the feature common to the access in the first time slot that have been extracted at the first extracting.

According to the exemplary embodiment of this invention, the narrowing down of the cause of a failure can be made efficient. Other objects, configurations, and effects than those described above become apparent from the following description of an embodiment of this invention.

BRIEF DESCRIPTION OF THE DRAWINGS

FIG. 6 is an explanatory diagram illustrating an example of the data structure of the monitoring information stream, which is output from the stream data processing system of FIG. 5.

FIG. 7 is an explanatory diagram illustrating an example of the data structure of the access performance information stream.

FIG. 8 is an explanatory diagram illustrating an example of the data structure of the access details information stream.

FIG. 12 is an explanatory diagram illustrating an example of the data structure of the service performance statistics stream, which is illustrated in FIG. 11.

FIG. 13 is an explanatory diagram illustrating an example of a service performance information table.

FIG. 14 is an explanatory diagram illustrating an example of an access details information table and a delayed access details information table.

FIG. 15 is an explanatory diagram illustrating an example of the data structure of the system performance statistics stream, which is illustrated in FIG. 11.

FIG. 16 is an explanatory diagram illustrating an example of a system performance information table.

FIG. 17 is an explanatory diagram illustrating an example of an SQL execution information table and a delayed SQL execution information table.

DETAILED DESCRIPTION OF THE PREFERRED EMBODIMENT

There is a huge number of services on the Internet at present and various services are available for use. Service providers are launching new services one after another, or renovating existing services in a short span. Business organizations develop services for their own use or for use outside their organizations, or utilize others' services, in order to improve the speed of the business and make the business efficient. Under these rapid changes on the service provider side and the service user side both, various services are demanded to be always on hand and stress-free to use. An embodiment of this invention therefore proposes a system in which, in addition to monitoring loads on servers used to build the system, service performance viewed from end users can be monitored with precision at a light introduction load, whether there is a problem or not can be determined quickly from the result of the monitoring, and the cause of the problem is traced speedily for the planning of countermeasures.

<Example of Failure Cause Identification>

Figure 1:
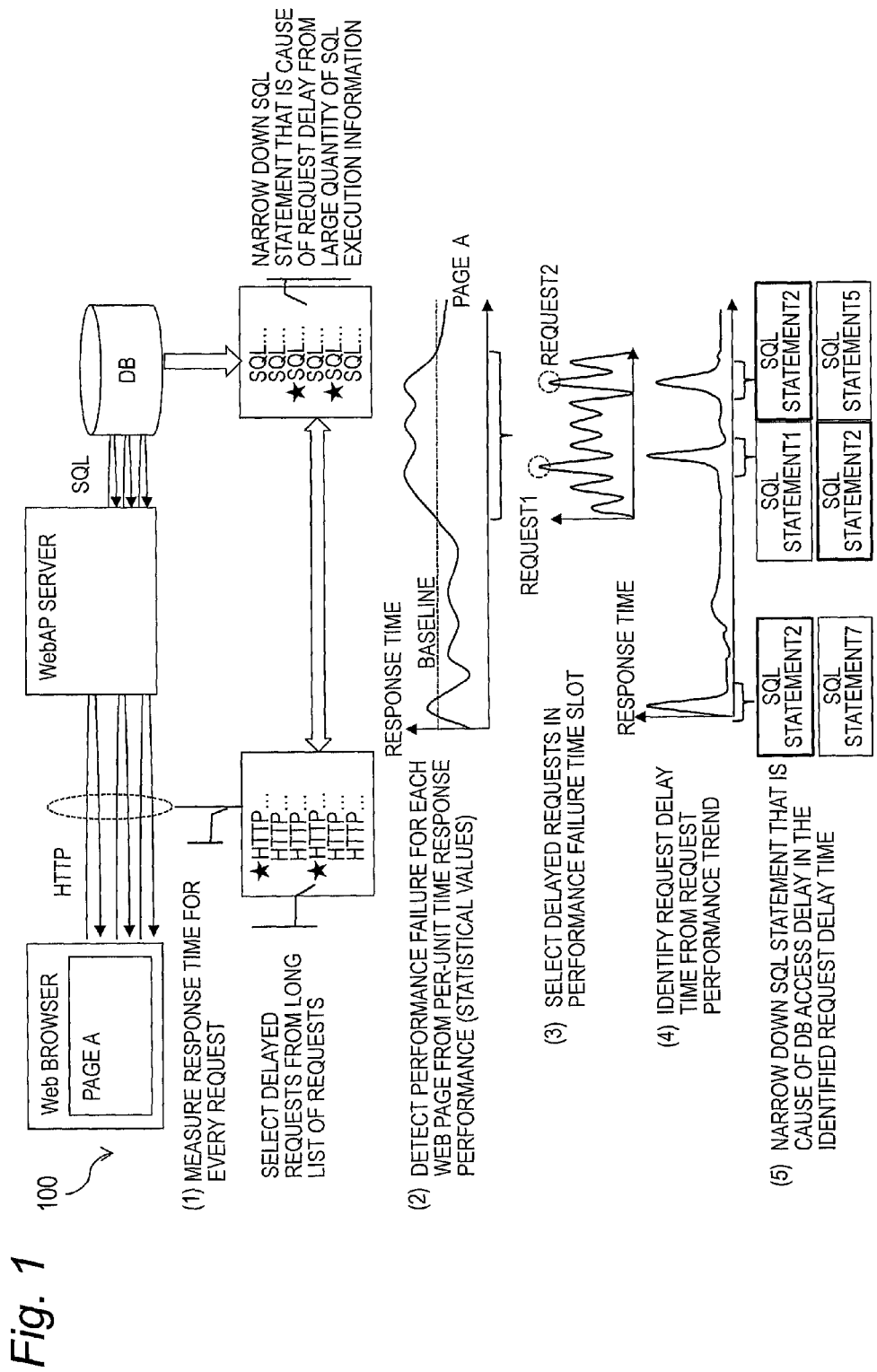
FIG. 1 is an explanatory diagram illustrating an example of failure cause identification according to this embodiment.

FIG. 1 is an explanatory diagram illustrating an example of failure cause identification according to this embodiment. The failure cause identification according to this embodiment is a method involving detecting a performance failure in a service that is used over the Web, investigating the cause of the failure, and identifying the cause. In this embodiment, traffic through a network switch is collected by mirroring. A monitoring system 100 is configured to (1) measure the response time for every request, (2) detect a performance failure for each Web page from response performance (a statistical value) per unit time, (3) select a delayed request in a performance failure time slot, (4) identify a request delay time slot from the trend of request performance, and (5) narrow down a Structured Query Language (SQL) statement that is the cause of a delay in DB access in the identified time slot. Identification of the cause of a service performance failure hitherto requires that a mechanism for trace analysis be inside a Web AP server. This embodiment enables a system environment in which a Web AP server does not have a trace analysis function to select delayed requests from a long list of requests and narrow down an SQL statement that is the cause of a delay from a large quantity of SQL execution information.

<System Configuration Example of the Monitoring System 100>

Figure 2:
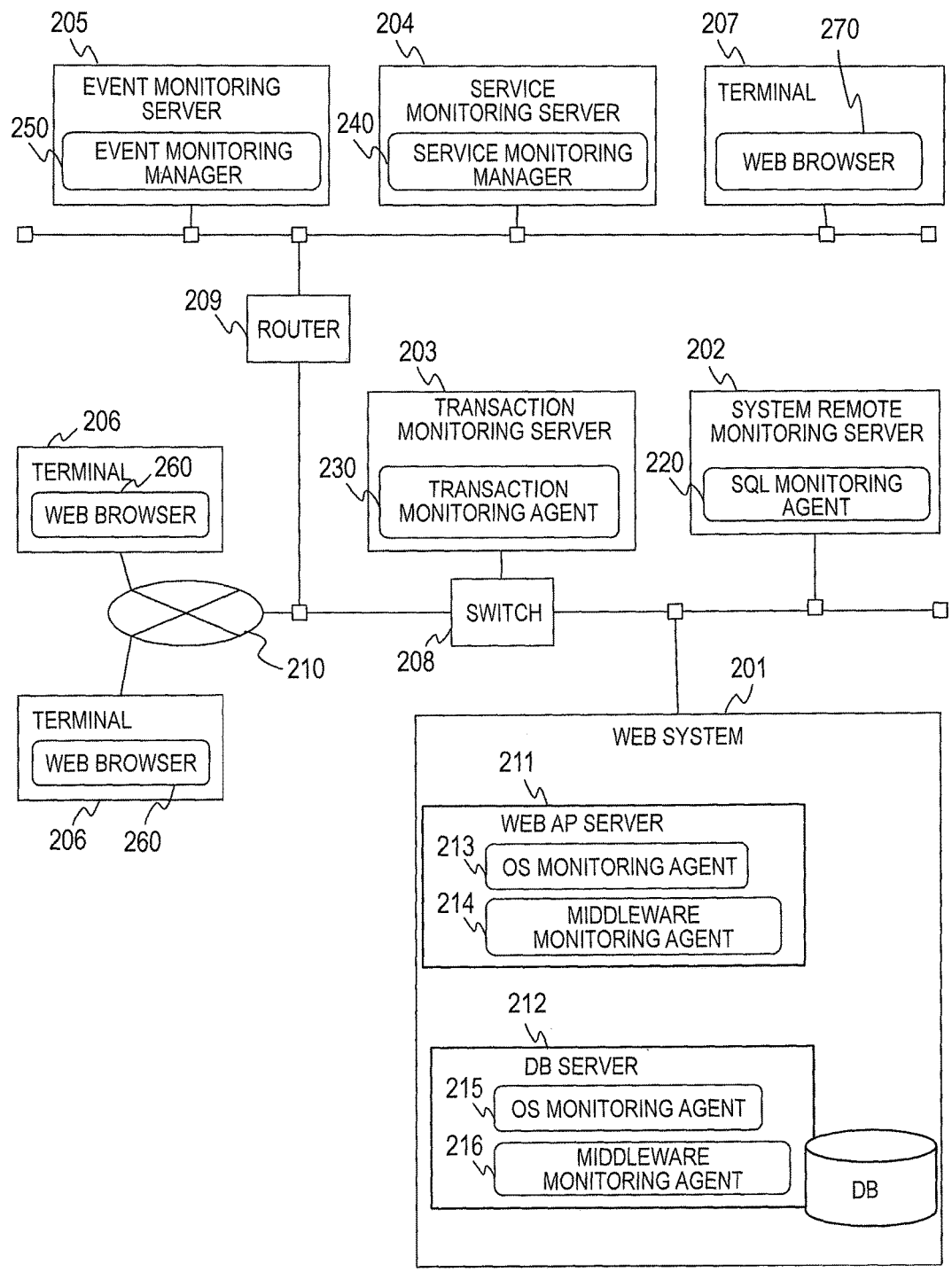
FIG. 2 is a system configuration diagram of the monitoring system 100 illustrated in FIG. 1.

FIG. 2 is a system configuration diagram of the monitoring system 100 illustrated in FIG. 1. In the monitoring system 100, Web systems 201, a system remote monitoring server 202, a transaction monitoring server 203, a service monitoring server 204, an event monitoring server 205, terminals 206, and a terminal 207 are coupled to one another via a switch 208, a router 209, and a network 210. Targets of monitoring by the monitoring system 100 are the Web systems 201, which are the foundations for service execution, and services that end users use from their respective terminals 206 with the use of Web browsers 260 over the network 210. The monitoring system 100 monitors the plurality of Web systems 201 and services that are made available for use on the Web systems 201.

Each Web system 201 includes a Web AP server 211 and a DB server 212. The Web AP server 211 has an OS monitoring agent 213 and a middleware monitoring agent 214. The DB server 212 has an OS monitoring agent 215 and a middleware monitoring agent 216. The OS monitoring agents 213 and 215 are residents in the monitoring target servers to monitor the running performance of OSs in the monitoring target servers. The middleware monitoring agents 214 and 216 are residents in the monitoring target servers to monitor the running performance of middleware.

The OS monitoring agents 213 and 215 and the middleware monitoring agents 214 and 216 in the Web system 201 and an SQL monitoring agent 220 in the system remote monitoring server 202 each transmit the result of performance monitoring to the service monitoring server 204 as a system performance information stream. In the case of service monitoring that is used by Web access, transmission/reception packets of the Web system 201 are mirrored from a mirror port of the switch 208 and transmitted to the transaction monitoring server 203.

The system remote monitoring server 202 is a server for remotely monitoring the Web system 201, and has the SQL monitoring agent 220 for that purpose. The SQL monitoring agent 220 monitors the SQL execution time of the DB server 212 in the Web system 201, and collects from the DB server 212 SQL execution information, which indicates the result of executing an SQL statement.

The transaction monitoring server 203 is a server for monitoring a transaction that passes through the switch 208, and has a transaction monitoring agent 230 for that purpose. The transaction monitoring agent 230 analyzes a Hypertext Transfer Protocol (HTTP) packet and calculates the response time.

The transaction monitoring server 203 transmits to the service monitoring server 204 the outline and response time of the HTTP packet which is the result of monitoring. A plurality of transaction monitoring servers 203 may be provided to collect and analyze packets from the switches 208 to which the transaction monitoring servers 203 are respectively connected. Other components than the transaction monitoring server 203 may collect packets traveling over the network 210 and analyze an HTTP packet to calculate the response time and output the outline and response time of the HTTP packet.

The service monitoring server 204 is a server for monitoring a service that is provided by the Web system 201, and has a service monitoring manager 240 for that purpose. The service monitoring manager 240 compares a server running performance value against a static or dynamic baseline to perform anomaly determination, and notifies an anomaly. The service monitoring manager 240 also compares, based on the outline and response time of an HTTP packet, for each monitoring target service, the response time against a baseline to perform anomaly determination, and notifies an anomaly to an event monitoring manager 250 of the event monitoring server 205. The result of the service monitoring can be checked remotely with the use of a Web browser 270 of the terminal 207.

The event monitoring server 205 is a server for monitoring an event, and has the event monitoring manager 250 for that purpose. The event monitoring manager 250 monitors for anomaly notification from the service monitoring manager 240. The result of the event monitoring can be checked remotely with the use of the Web browser 270 of the terminal 207.

<Detailed Description of the System Remote Monitoring Server 202>

Figure 3:
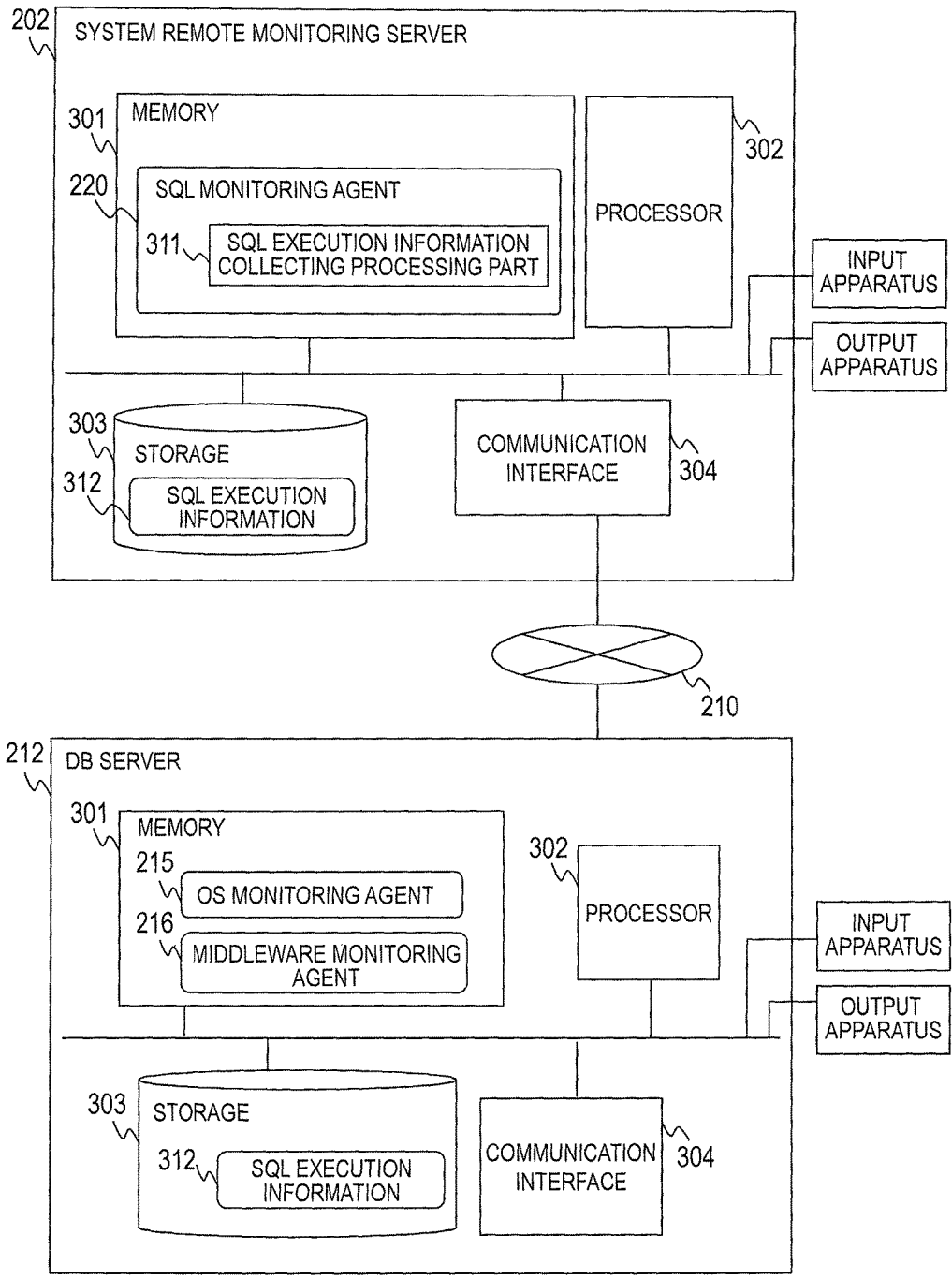
FIG. 3 is a block diagram illustrating a detailed configuration of the system remote monitoring server.

FIG. 3 is a block diagram illustrating a detailed configuration of the system remote monitoring server 202. Information processing by the SQL monitoring agent 220 of the system remote monitoring server 202 can be implemented concretely by hardware that includes a memory 301, a processor 302, storage 303, and a communication interface 304.

An SQL execution information collecting processing part 311 can be implemented by the processor 302 through information processing of a program read onto the memory 301. The storage 303 stores SQL execution information 312.

The SQL execution information 312 which is stored in the storage 303 of the DB server 212 and transmitted to the system remote monitoring server 202 is input to the communication interface 304. The communication interface 304 stores the input SQL execution information 312 in the storage 303 of its own server.

The DB server 212 has the OS monitoring agent 215 and the middleware monitoring agent 216 on its memory 301. The DB server 212 stores the SQL execution information 312 which indicates the result of executing an SQL statement in its storage 303. The system remote monitoring server 202 monitors the DB server 212 via the SQL execution information collecting processing part 311 and, when the SQL execution information 312 is output, collects the SQL execution information 312 and stores the SQL execution information 312 in the storage 303.

<Detailed Description of the Transaction Monitoring Server 203>

Figure 4:
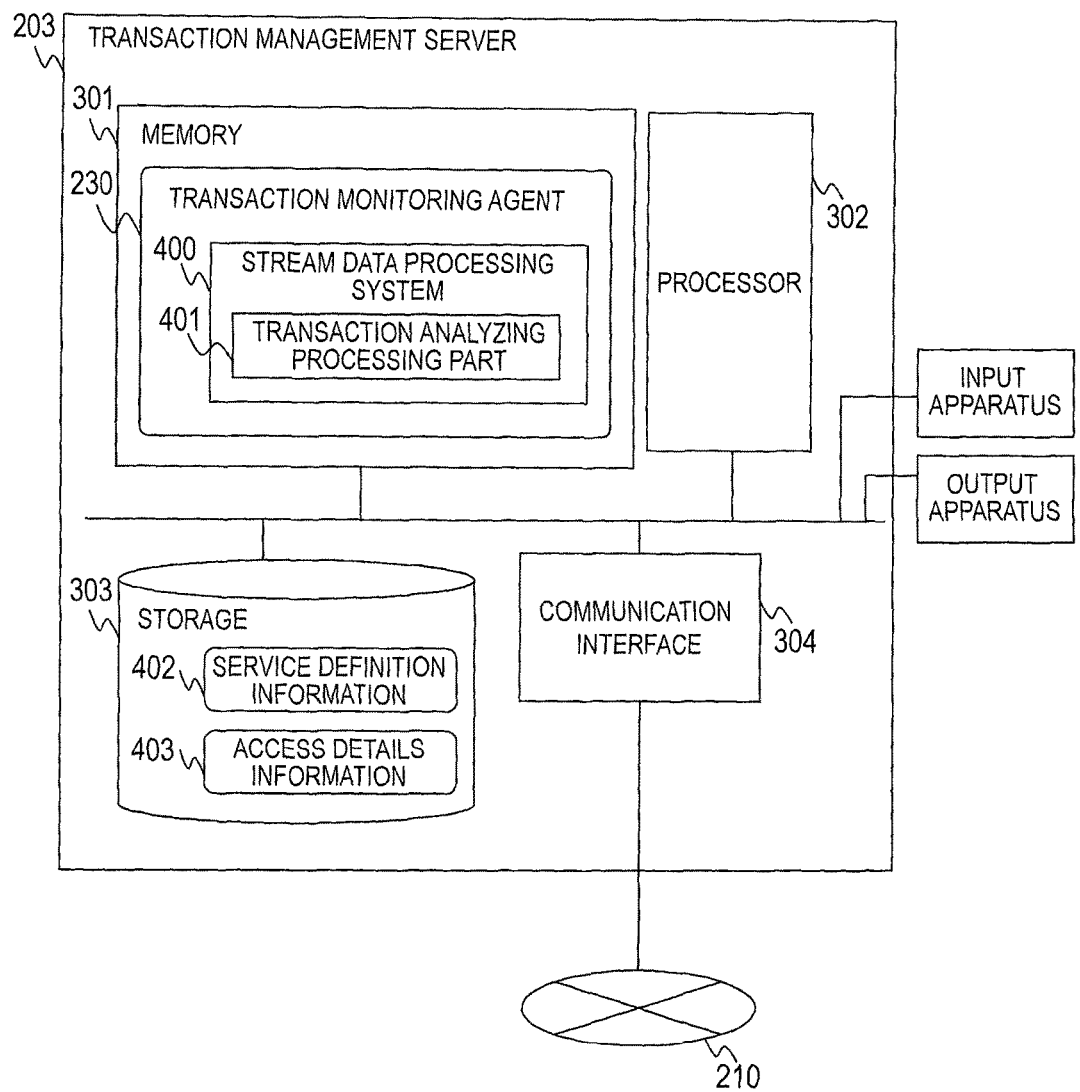
FIG. 4 is a block diagram illustrating a detailed configuration of the transaction monitoring server.

FIG. 4 is a block diagram illustrating a detailed configuration of the transaction monitoring server 203. Information processing by the transaction monitoring agent 230 of the transaction monitoring server 203 can be implemented concretely by hardware that includes the memory 301, the processor 302, the storage 303, and the communication interface 304.

The transaction monitoring agent 230 includes a stream data processing system 400. The stream data processing system 400 includes a transaction analyzing processing part 401. The transaction analyzing processing part 401 can be implemented by the processor 302 through information processing of a program read onto the memory 301. The storage 303 stores service definition information 402 and access details information 403.

The service definition information 402 is information that defines services, and includes a Uniform Resource Identifier (URI) that identifies a service, a Uniform Resource Locator (URL) that identifies the location of a page related to the service, and access that identifies access (a request or a response) to the page. The access details information 403 is a part of data output from the transaction monitoring agent 230, and is detailed information of access to the Web system 201 such as a request or a response.

HTTP packet information received from the switch 208 and HTTP packet information to be transmitted to the service monitoring server 204 are input to the communication interface 304. The transaction monitoring agent 230 analyzes an HTTP packet to calculate the response time as the monitoring result. The transaction monitoring server 203 thus transmits to the service monitoring server 204 the outline and response time of the HTTP packet which is the monitoring result.

Figure 5:
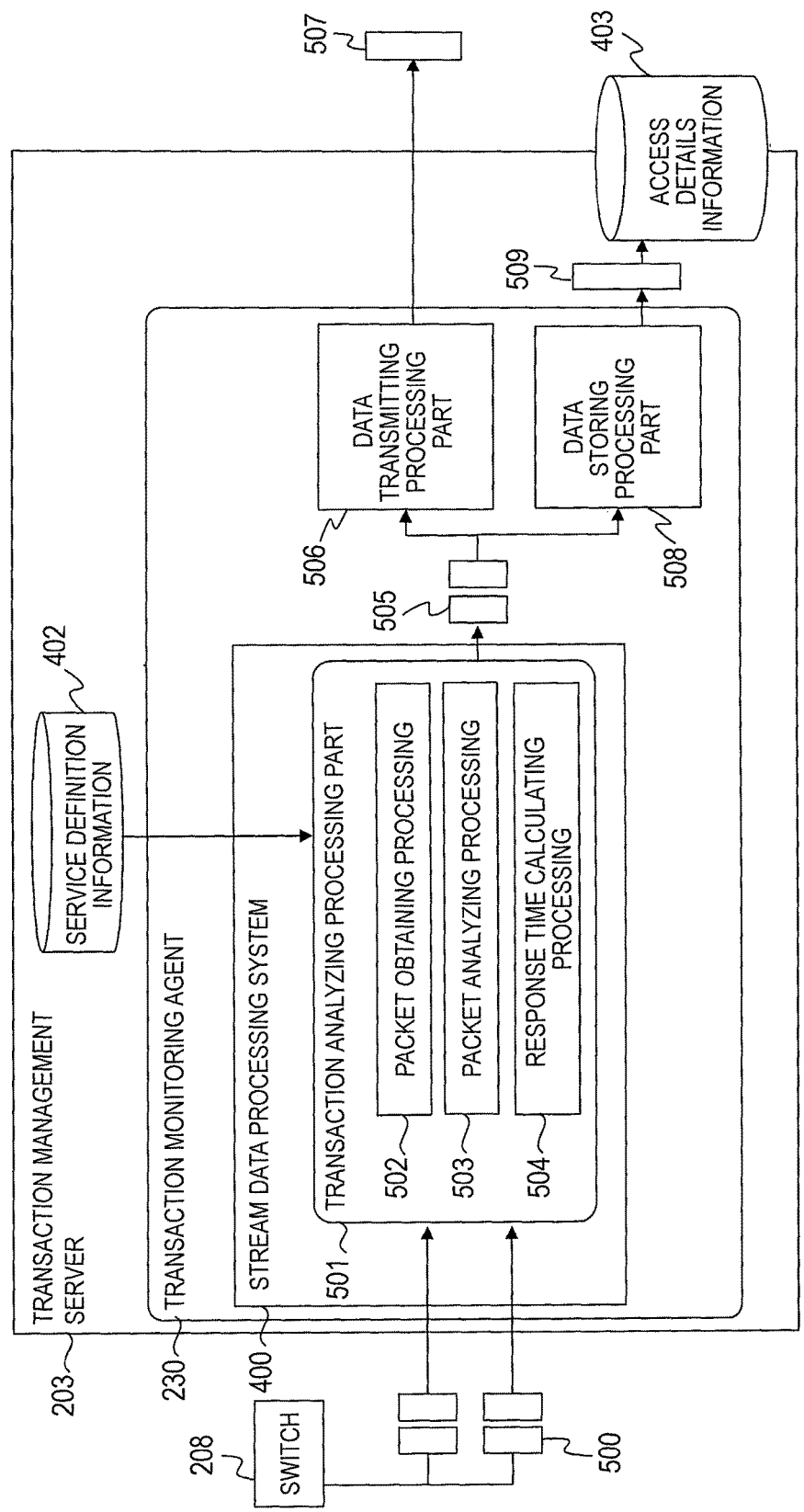
FIG. 5 is an explanatory diagram illustrating an example of the specifics of processing in the transaction monitoring server.

FIG. 5 is an explanatory diagram illustrating an example of the specifics of processing in the transaction monitoring server 203. The technology disclosed in Japanese Patent Application Laid-open No. 2006-338432 can be used for processing in the stream data processing system 400 such as storing stream data, analyzing a received query, and registering an optimized and generated query execution format.

An input stream 500 of HTTP packets is sent from the switch 208 into the stream data processing system 400. The input stream 500 is processed in a transaction analyzing processing part 501 through packet obtaining processing 502, packet analyzing processing 503, and response time calculating processing 504 in the order stated by referring to the service definition information 402. The packet analyzing processing 503 includes attaching service information of the service definition information 402 to the input stream 500.

The response time calculating processing 504 includes calculating a response time by checking consistency between incoming packets and outgoing packets. A monitoring information stream 505 which is an output stream is a data stream that includes the response time with service information attached thereto. A data transmitting processing part 506 sends an access performance information stream 507 to the service monitoring server 204. A data storing processing part 508 stores an access details information stream 509 in the access details information 403.

FIG. 6 is an explanatory diagram illustrating an example of the data structure of the monitoring information stream 505, which is output from the stream data processing system 400 of FIG. 5. The monitoring information stream 505 includes, for each transaction (a combination of a request and a response to the request), a time 601, a service group name 602, service information 603, page information 604, request information 605, response information 606, and a response time 607. Stored as the time 601 is a time at which monitoring has been executed (for example, the time of reception of a request packet). Registered as the service group name 602, the service information 603, and the page information 604, respectively, are the service group name 602, the service information 603, and the page information 604 that are associated with access of the HTTP packet. The service group name 602, the service information 603, and the page information 604 are obtained from the service definition information 402.

The request information is obtained from the request packet. The contents of the request information include a transmission source Internet Protocol (IP) address 605a, a method 605b, a URL path 605c, and a URL query 605d. The response information 606 is obtained from the response packet. The contents of the response information include an HTTP status 606a and a transfer data amount 606b.

FIG. 7 is an explanatory diagram illustrating an example of the data structure of the access performance information stream 507. The access performance information stream 507 includes, for each transaction (a combination of a request and a response to the request), the time 601, the service group name 602, the service information 603, the page information 604, and access performance information 700. The service information 603 includes a service name 603a and a URI 603b. The page information 604 includes a page name 604a and a URL 604b. The access performance information 700 includes the response information 606 and the response time 607. In short, the access performance information stream 507 is information that is obtained by removing the request information from the monitoring information stream 505.

FIG. 8 is an explanatory diagram illustrating an example of the data structure of the access details information stream 509. The access details information stream 509 includes the time 601, the service group name 602, the service information 603, the page information 604, and access details information 800. The access details information 800 includes the request information 605, the response information 606, and the response time 607.

In other words, the data transmitting processing part 506 in FIG. 5 outputs, as the access performance information stream 507, the monitoring information stream 505 minus the request information. The data storing processing part 508 outputs the monitoring information stream 505 as the access details information stream 509.

<Detailed Description of the Service Monitoring Server 204>

Figure 9:
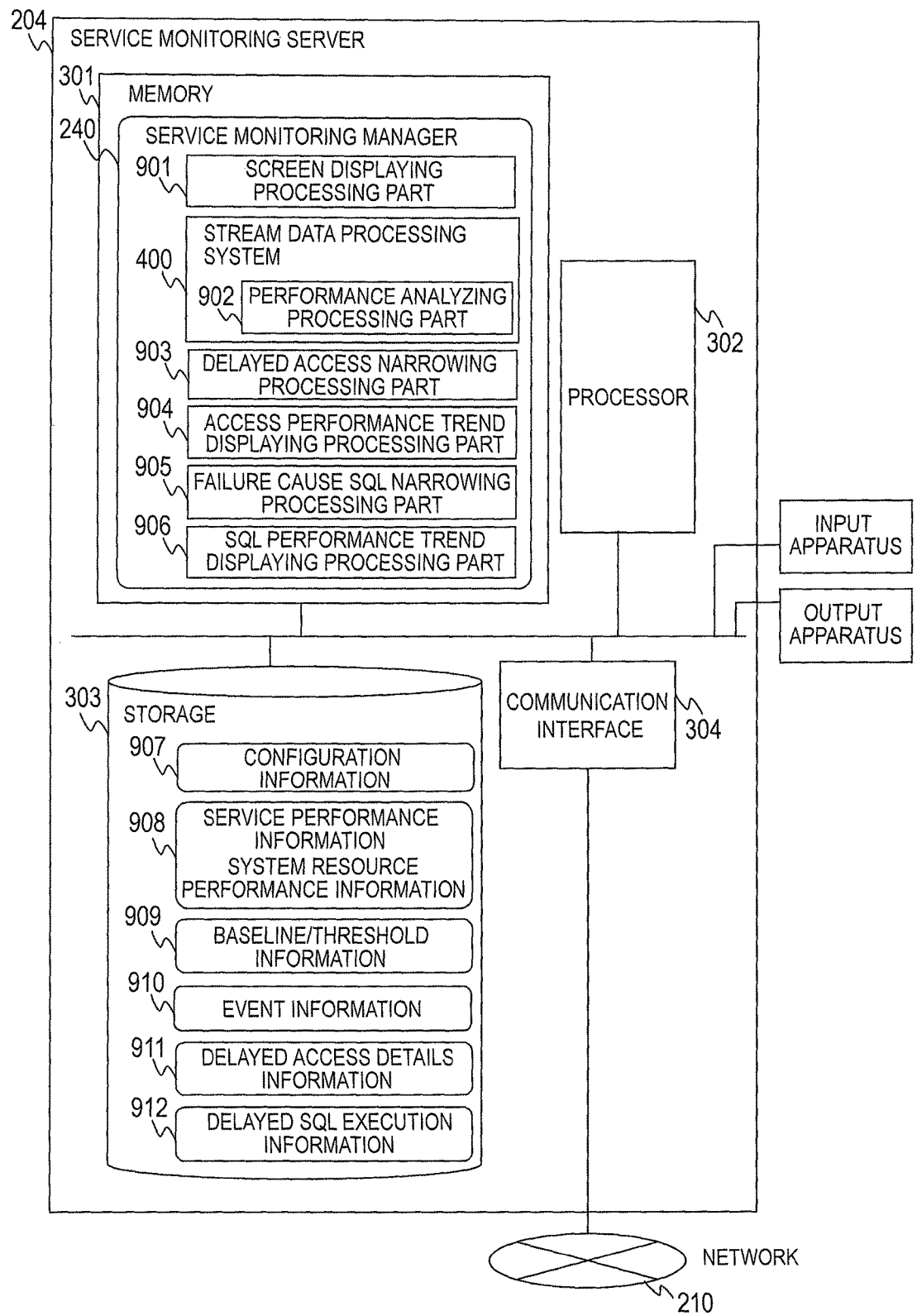
FIG. 9 is a block diagram illustrating a detailed configuration of the service monitoring server, which is illustrated in FIG. 2.

FIG. 9 is a block diagram illustrating a detailed configuration of the service monitoring server 204, which is illustrated in FIG. 2. Information processing by the service monitoring manager 240 of the service monitoring server 204 can be implemented concretely by hardware that includes the memory 301, the processor 302, the storage 303, and the communication interface 304.

The service monitoring manager 240 includes a screen displaying processing part 901, a performance analyzing processing part 902, a delayed access narrowing processing part 903, an access performance trend displaying processing part 904, a failure cause SQL narrowing processing part 905, and an SQL performance trend displaying processing part 906. The screen displaying processing part 901, the performance analyzing processing part 902, the delayed access narrowing processing part 903, the access performance trend displaying processing part 904, the failure cause SQL narrowing processing part 905, and the SQL performance trend displaying processing part 906 can be implemented by the processor 302 through information processing of a program read onto the memory 301. The specifics of these processing procedures are described later.

The storage 303 stores configuration information 907, performance information 908, baseline/threshold information 909, event information 910, delayed access details information 911, and delayed SQL execution information 912. The configuration information 907 is information about a business operation group which consolidates business operations in which a service and a system are linked. Details thereof are described with reference to FIG. 10. The performance information 908 is information that includes service performance information, which indicates the performance of a service, and system performance information, which indicates the performance of a system. The service performance information is information about the performance of a service such as whether the service is normal or not normal, the response time, the throughput, and the error rate. The system performance information is information about the performance of a system such as whether the system is normal or not normal, host information, an agent, a metric, and a performance value.

The baseline/threshold information 909 is a static or dynamic threshold to be compared with a server running performance value in the service monitoring manager 240. The event information 910 is a response time to be compared against the baseline/threshold information 909 for each monitoring target service in the service monitoring manager 240 based on the outline and response time of an HTTP packet. The delayed access details information 911 is access performance information about access that is delayed out of access records of the access details information 800. The delayed SQL execution information 912 is SQL execution information about processing in accordance with a delayed SQL statement out of pieces of SQL execution information. The SQL execution information is described later.

Information input/output through the communication interface 304 includes input/output information that is exchanged with the terminal 207 via the Web browser 270, system resource performance information which is a part of the performance information 908 and which is received from the Web system 201, the delayed SQL execution information 912 which is received from the system remote monitoring server 202, and HTTP packet information (the outline and response of an HTTP packet) which is received from the transaction monitoring server 203.

Figure 10:
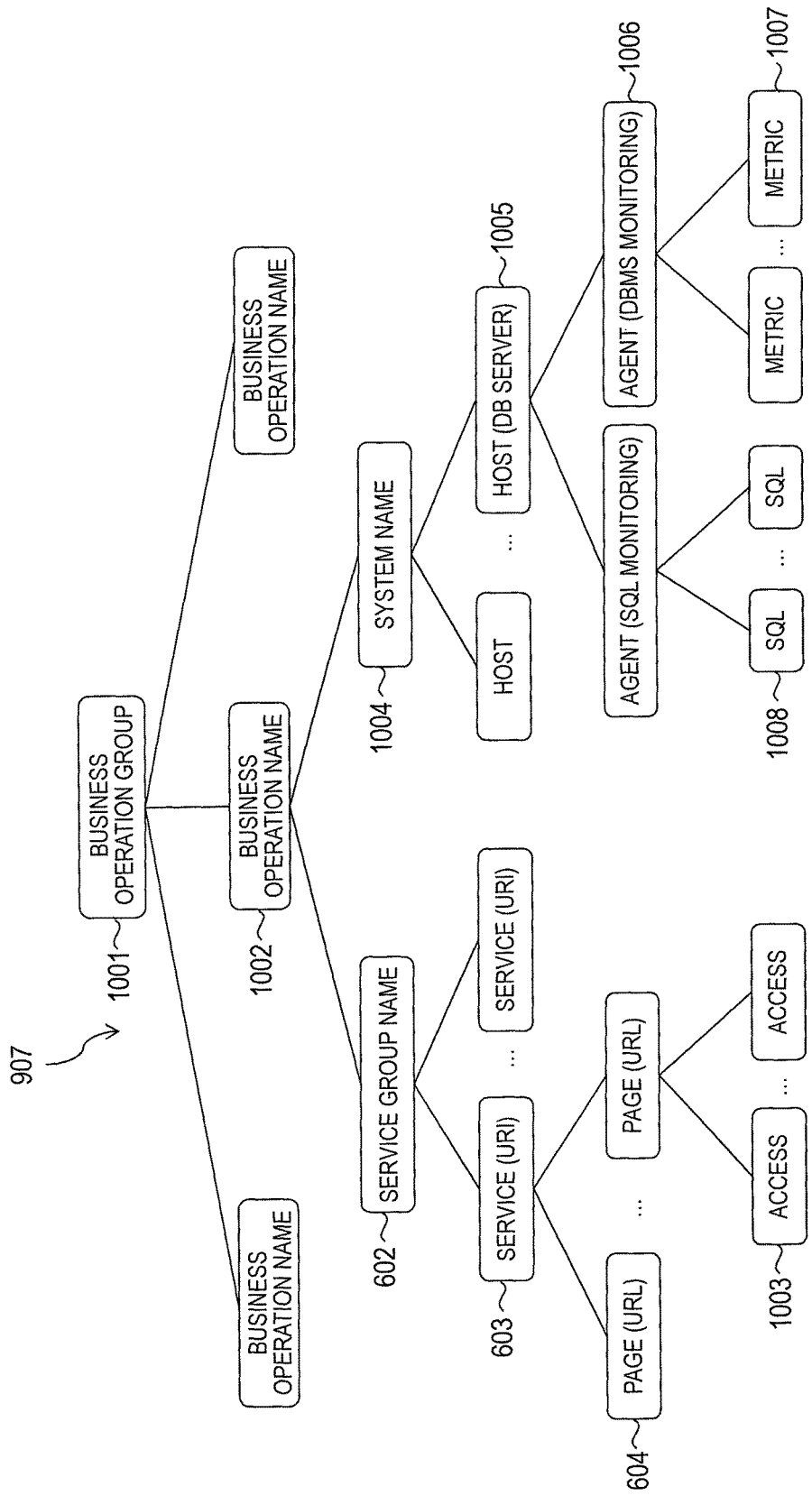
FIG. 10 is an explanatory diagram illustrating an example of the data structure of the configuration information, which is illustrated in FIG. 9.

FIG. 10 is an explanatory diagram illustrating an example of the data structure of the configuration information 907, which is illustrated in FIG. 9. A business operation group 1001 includes business operation names 1002. Each business operation name 1002 includes the service group name 602 and a system name 1004. The service group name 602 includes the service information 603. The service information 603 includes the page information 604. The page information 604 includes access 1003. The system name 1004 includes host information 1005. The host information 1005 includes an agent name 1006. The agent name 1006 includes one of a metric 1007 and SQL information 1008. Of the configuration information 907, information below the service group name 602 corresponds to the service definition information 402.

This means that, once the access 1003 is identified, the page information 604, the service information 603, the service group name 602, the business operation name 1002, and the business operation group 1001 that are above the access 1003 are identified, and information below a system name 1004 that is associated with the identified business operation name 1002 is identified as well. Similarly, once the SQL information 1008 or the metric 1007 is identified, the agent name 1006, the host information 1005, the system name 1004, the business operation name 1002, and the business operation group 1001 that are above the SQL information 1008 or the metric 1007 are identified, and information below the service group name 602 that is associated with the identified business operation name 1002 is identified as well.

Figure 11:
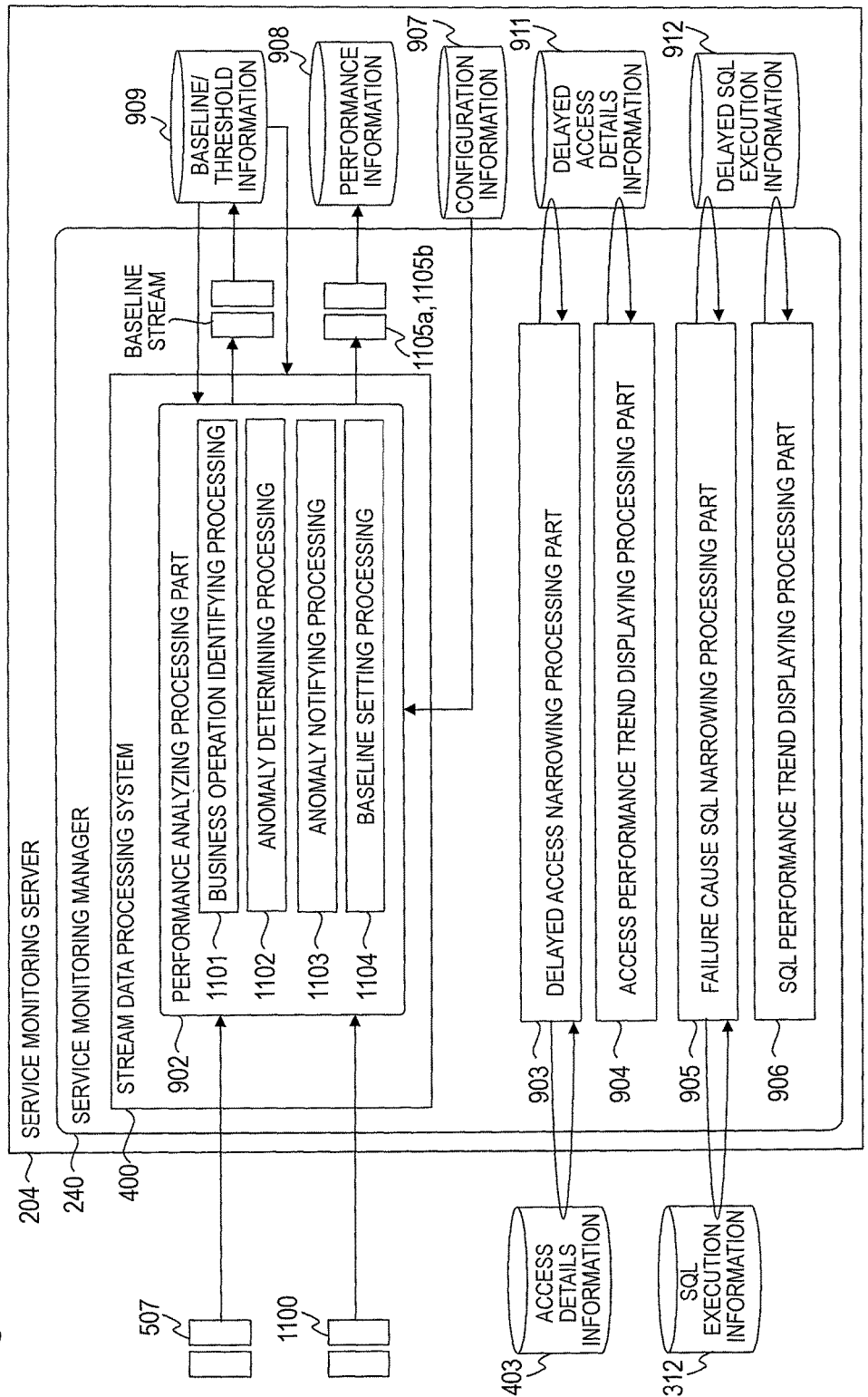
FIG. 11 is an explanatory diagram illustrating an example of the specifics of processing that is executed by the service monitoring server.

FIG. 11 is an explanatory diagram illustrating an example of the specifics of processing that is executed by the service monitoring server 204. The service monitoring manager 240 includes the stream data processing system 400. The stream data processing system 400 includes the performance analyzing processing part 902. The technology disclosed in Japanese Patent Application Laid-open No. 2006-338432 can be used for processing in the stream data processing system 400 such as storing stream data, analyzing a received query, and registering an optimized and generated query execution format.

The stream data processing system 400 receives the access performance information stream 507 from the transaction monitoring server 203. The stream data processing system 400 also receives system performance information stream 1100 from the Web system 201. The access performance information stream 507 and the system performance information stream 1100 (hereinafter collectively referred to as "performance information stream") are given to the performance analyzing processing part 902.

The performance analyzing processing part 902 executes business operation identifying processing 1101, anomaly determining processing 1102, anomaly notifying processing 1103, and baseline setting processing 1104 in the order stated. In the business operation identifying processing 1101, the monitoring information stream 505 with a business operation name is generated. The monitoring information stream 505 with a business operation name is a stream that is generated by attaching to the performance information stream a business operation name which is made up of a service and system of the configuration information 907.

The anomaly determining processing 1102 includes processing performance values of a service performance stream with a business operation name that is within a given period of time (a minute, for example) by performing statistical processing (for example, calculating an average value, a maximum value, a minimum value, or a variance value) for each service. In the anomaly determining processing 1102, the calculated statistical value is compared against a baseline to determine whether the baseline is exceeded, and a service performance statistics stream 1105a which includes the result of the determination is stored in the performance information 908.

The anomaly determining processing 1102 also includes comparing against a baseline a performance value of a system performance information stream with a business operation name to determine whether the baseline is exceeded, and storing a system performance information statistics stream 1105b which includes the result of the determination in the performance information 908.

In the anomaly notifying processing 1103, the event monitoring server 205 is notified of an anomaly when it is determined that there is an anomaly in service performance and system performance.

The baseline setting processing 1104 includes processing performance values of a service performance stream with a business operation name that is within a given period of time (an hour, for example) by performing statistical processing (for example, calculating an average value, a maximum value, a minimum value, or a variance value) for each service. The calculated statistical value is stored in the baseline/threshold information 909. The baseline setting processing 1104 also includes processing performance values of a system performance information stream with a business operation name that is within a given period of time (an hour, for example) by performing statistical processing (for example, calculating an average value, a maximum value, a minimum value, or a variance value) for each host for each item monitored by an agent of the host. The calculated statistical value is stored in the baseline/threshold information 909.

The baseline setting processing 1104 also includes detecting, in the units of a given period of time (an hour, for example), for each service, a date/time where an average value of the service's throughput/minute is close to the value of a past throughput/minute in the same time slot that is stored in the baseline/threshold information 909. The baseline setting processing 1104 also includes then storing the next time slot of the detected data as a business operation-by-business operation baseline employment date/time of the next time slot in the baseline/threshold information 909.

The delayed access narrowing processing part 903 obtains from the access details information 403 a piece of access details information in a time slot where a service performance failure has occurred, and stores the obtained information as delayed access details information 911. From among the obtained pieces of the delayed access details information 911, the delayed access narrowing processing part 903 extracts protracted access details information about access for which the delayed time is equal to or more than a given length of time. The delayed access narrowing processing part 903 then searches for a letter string common in URLs or queries of the extracted protracted access details information to create a filtering condition for grouping together requests that contain a common letter string in their URLs or queries.

The access performance trend displaying processing part 904 uses a filtering condition to obtain every piece of access information that is included in a request group from all pieces of access details information that are within a given period of time that spans before and after the occurrence of a service performance failure, and stores the obtained information in the delayed access details information 911. The access performance trend displaying processing part 904 then displays response times of access information in the delayed access details information 911 in a trend graph.

The failure cause SQL narrowing processing part 905 identifies a request response delay time slot from the response performance trend of grouped requests. The failure cause SQL narrowing processing part 905 obtains from the SQL execution information 312 pieces of SQL execution information about SQL statements that are executed in the same time slot as the request response delay time slot identified, and stores the obtained information in the delayed SQL execution information 912.

The SQL performance trend displaying processing part 906 extracts protracted SQL execution from pieces of SQL execution information that are obtained from the delayed SQL execution information 912, and displays a response performance trend on an SQL ID-by-SQL ID basis. The SQL performance trend displaying processing part 906 compares the response performance of grouped requests and the SQL ID-by-SQL ID response performance to determine an SQL statement for which a correlation is found through the comparison as an SQL statement that is the cause of a performance failure.

FIG. 12 is an explanatory diagram illustrating an example of the data structure of the service performance statistics stream 1105a, which is illustrated in FIG. 11. The service performance statistics stream 1105a is a data stream that is output by the stream data processing system 400 as the result of determination of the anomaly determining processing 1102. A service of a business operation at a time point constitutes one piece of data of the service performance statistics stream 1105a. One piece of data includes at least one transaction.

The service performance statistics stream 1105a includes the time 601, the business operation name 1002, the service group name 602, the service information 603, the page information 604, a determination 1201, a per-minute response time (statistical value) 1202, a per-minute throughput 1203, and a per-minute error rate 1204.

As the time 601, the business operation name 1002, the service group name 602, the service information 603, and the page information 604, the time 601, business operation name 1002, service group name 602, service information 603, and page information 604 of the access performance information stream 507 that is the source are used. The result of determination of the anomaly determination processing 1102 ("normal" or "not normal") is stored as the determination 1201. Stored as the per-minute response time 1202 are an average value, a minimum value, a maximum value, and a variance value as statistical values of the response time per minute in the entry in question. A value obtained by cumulating per-minute throughputs in the entry in question is stored as the per-minute throughput 1203. A value obtained by cumulating per-minute error rates in the entry in question is stored as the per-minute error rate 1204.

FIG. 13 is an explanatory diagram illustrating an example of a service performance information table. The service performance information table 908*a* is a table in which the service performance statistics stream 1105*a* of FIG. 12 is recorded for each piece of data. In other words, one record corresponds to a piece of data of the service performance statistics stream 1105*a*.

FIG. 14 is an explanatory diagram illustrating an example of an access details information table and a delayed access details information table. The access details information table 1400 and the delayed access details information table 1401 have the same configuration and are therefore described together. The access details information table 1400 and the delayed access details information table 1401 store the access details information stream 509 of FIG. 8 on a piece of data-by-piece of data basis. For instance, one entry in FIG. 14 represents one HTTP request.

FIG. 15 is an explanatory diagram illustrating an example of the data structure of the system performance statistics stream 1105*b*, which is illustrated in FIG. 11. The system performance statistics stream 1105*b* is a data stream that is output by the stream data processing system 400 as the result of determination of the anomaly determining processing 1102 about the Web system 201. A system of a business operation at a time point constitutes one piece of data of the system performance statistics stream 1105*b*. One piece of data includes at least one transaction.

The system performance statistics stream 1105*b* includes the time 601, the business operation name 1002, the system name 1004, the host information 1005, the agent name 1006, the metric 1007, a performance value 1501, and a determination 1502. As the time 601, the business operation name 1002, the system name 1004, the host information 1005, the agent name 1006, the metric 1007, and the performance value 1501, information in the system performance information stream 1100 that is the source is used. The result of determination of the anomaly determining processing 1102 ("normal" or "not normal") is stored as the determination 1502.

FIG. 16 is an explanatory diagram illustrating an example of a system performance information table. The system performance information table 908*b* is a table in which the system performance statistics stream 1105*b* of FIG. 15 is recorded for each piece of data. In other words, one record corresponds to a piece of data of the system performance statistics stream 1105*b*.

FIG. 17 is an explanatory diagram illustrating an example of an SQL execution information table and a delayed SQL execution information table. The SQL execution information table 1700 and the delayed SQL execution information table 1701 have the same configuration and are therefore described together. The SQL execution information table 1700 and the delayed SQL execution information table 1701 store the system performance information stream on a piece of data-by-piece of data basis. The SQL execution information table 1700 and the delayed SQL execution information table 1701 store the time 601, the business operation name 1002, the system name 1004, the host information 1005 (a host name 1005*a* and an IP address 1005*b*), the agent name 1006, the SQL information 1008, and an execution time 1702. An SQL_ID 1008*a*, a hash value 1008*b*, and an SQL text 1008C are stored in the SQL information 1008.

<Detailed Description of the Delayed Access Narrowing Processing Part 903 and the Access Performance Trend Displaying Processing Part 904>

Figure 18:
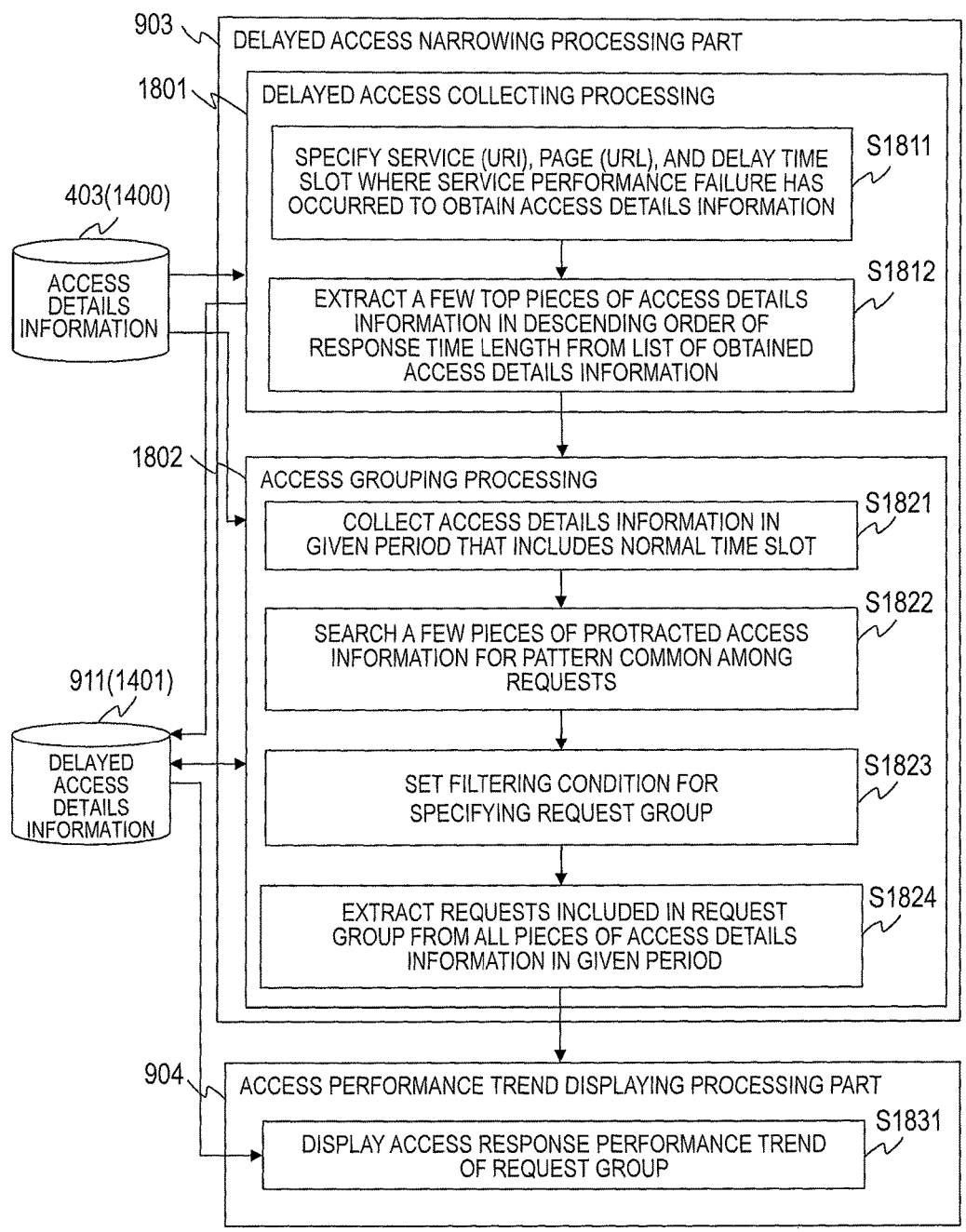
FIG. 18 is an explanatory diagram illustrating the flow of processing of the delayed access narrowing processing part and the access performance trend displaying processing part.

FIG. 18 is an explanatory diagram illustrating the flow of processing of the delayed access narrowing processing part 903 and the access performance trend displaying processing part 904. The delayed access narrowing processing part 903 is described first. The delayed access narrowing processing part 903 executes delayed access collecting processing 1801 and access grouping processing 1802.

In the delayed access collecting processing 1801, the delayed access narrowing processing part 903 obtains the delayed access details information 911 from the access details information 403 based on the service name (URI) of a service where a performance failure has occurred, page information (URL), and a delay time slot that are specified (Step S1811).

Specifically, when a user's input operation specifies a service name (URI), page information (URL), and a delay time slot, for example, the delayed access narrowing processing part 903 obtains pieces of access details information that have the specified service name (URI), page information (URL), and delayed time slot (the delayed access details information 911) from the access details information 403. A list of the obtained pieces of the delayed access details information 911 is displayed on the screen. It is sufficient if at least the delayed time slot is specified out of the page information (URL) and the delayed time slot.

From among the pieces of the delayed access details information 911, the delayed access narrowing processing part 903 extracts a few top pieces of the delayed access details information 911 in descending order of the length of the response time (S1812). Specifically, the delayed access narrowing processing part 903 extracts a few top pieces of the delayed access details information 911 in descending order of the length of the response time when, for example, the user specifies the pieces of information on the displayed list with the use of an input apparatus.

In the access grouping processing 1802, the delayed access narrowing processing part 903 collects from the access details information 403 pieces of access details information of a page where a service performance failure has occurred in a given period of time that includes a normal time slot (Step S1821).

The given period of time that includes a normal time slot is a period that does not consist solely of a period where a service is experiencing a failure, but is a period that includes at least a normal state period. To give a concrete example, the given period of time that includes a normal time slot is n hours counted back from the most recent failure event, or a period between the most recent failure event and a failure event that precedes the most recent failure event. The given period is specified by the user's operation. The delayed access narrowing processing part 903 therefore collects from the access details information 403 pieces of access details information that are within a given period of time specified by the user's operation.

In the next step of the access grouping processing 1802, the delayed access narrowing processing part 903 searches the few top pieces of the delayed access details information 911 in descending order of the length of the response time which have been extracted in Step S1812 for a common-to-requests pattern (Step S1822). A common-to-requests pattern is a letter string in service names, page information, URL paths, and URL queries in the delayed access details information 911 that is common.

For example, when "service 1" as a service name is found in a plurality of pieces of information among the few top pieces of the delayed access details information 911 in descending order of the length of the response time which have been extracted in Step S1812, "service 1" is counted as a common-to-requests pattern. Similarly, when "all" as a URL query is found in a plurality of pieces of information among the extracted pieces of information, "all" is counted as a common-to-requests pattern. A common-to-requests pattern may be searched for by automatic execution, or may be specified by the user's operation.

In the next step of the access grouping processing 1802, the delayed access narrowing processing part 903 sets a filtering condition for specifying a request group (Step S1823). Specifically, the delayed access narrowing processing part 903 sets a filtering condition by, for example, combining common-to-requests patterns that have been found in Step S1822. The delayed access narrowing processing part 903 uses, for example, one of or a combination of a logical sum, logical product, and a NOT operation of common-to-requests patterns. Pieces of delayed access details information that satisfy the set filtering condition constitute a request group.

In the next step of the access grouping processing 1802, the delayed access narrowing processing part 903 extracts requests that are included in the request group from the pieces of access details information within the given period of time about a page where the service performance failure has occurred which have been collected in Step S1821 (Step S1824).

Specifically, the delayed access narrowing processing part 903 extracts, for example pieces of access details information that satisfy the filtering condition from the pieces of access details information within the given period of time about a page where the service performance failure has occurred which have been collected in Step S1821. The extracted pieces of access details information represent HTTP requests that are included in the request group. The extracted pieces of access details information are stored in the delayed access details information 911 again.

Next, the access performance trend displaying processing part 904 displays an access response performance trend for each request in the request group (Step S1831). Specifically, the access performance trend displaying processing part 904 displays, for example, a trend graph of the access response performance of the request group by picking pieces of access details information that are included in the request group out of the delayed access details information 911. To give a concrete example, the access performance trend displaying processing part 904 consolidates pieces of access details information that are included in the request group by generating a graph that shows the response time and changes with time in access count due to HTTP requests. The consolidated information is referred to as access statistics. The access performance trend displaying processing part 904 displays the access statistics on the screen.

<Detailed Description of the Failure Cause SQL Narrowing Processing Part 905 and the SQL Performance Trend Displaying Processing Part 906>

Figure 19:
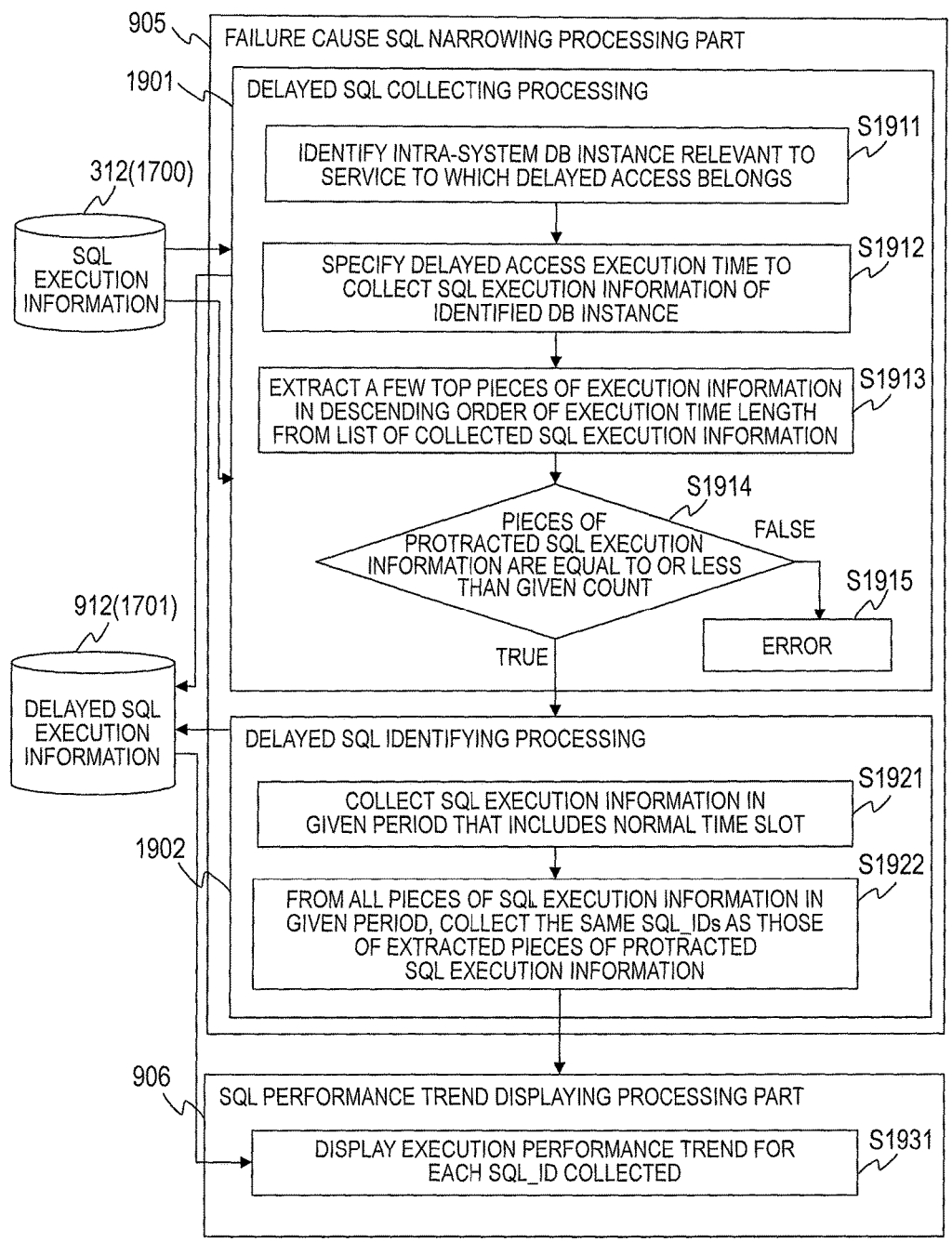
FIG. 19 is an explanatory diagram illustrating the flow of processing of the failure cause SQL narrowing processing part and the SQL performance trend displaying processing part.

FIG. 19 is an explanatory diagram illustrating the flow of processing of the failure cause SQL narrowing processing part 905 and the SQL performance trend displaying processing part 906. The failure cause SQL narrowing processing part 905 is described first. The failure cause SQL narrowing processing part 905 executes delayed SQL collecting processing 1901 and delayed SQL identifying processing 1902.

In the delayed SQL collecting processing 1901, the failure cause SQL narrowing processing part 905 identifies an intra-system DB instance that is associated with a service to which delayed access belongs (Step S1911). Specifically, the failure cause SQL narrowing processing part 905 identifies the intra-system DB instance by, for example, identifying from configuration information a business operation that provides a service that has received the HTTP requests narrowed down by the delayed access narrowing processing part 903, and identifying an SQL monitoring agent in a server that executes the identified business operation as the intra-system DB instance.

The failure cause SQL narrowing processing part 905 next specifies a delayed access execution time to collect pieces of SQL execution information of the DB instance identified in Step S1911 (Step S1912). The delayed access execution time is a time slot in which the response time reaches a given level or higher (e.g., a baseline or higher) in the access statistics displayed by the access performance trend displaying processing part 904. The delayed access execution time, when set automatically by the failure cause SQL narrowing processing part 905, is a time slot where the response time reaches a baseline or higher and, when specified by the user's operation, is a specified time slot in the access statistics. The collected pieces of SQL execution information of the DB instance are stored in the delayed SQL execution information 912.

From pieces of SQL execution information stored in the delayed SQL execution information 912, the failure cause SQL narrowing processing part 905 extracts a few top pieces of information in descending order of the length of the execution time (Step S1913). Specifically, the failure cause SQL narrowing processing part 905 extracts a few top pieces of SQL execution information in descending order of the length of the execution time by, for example, letting the user specify on the displayed list with the use of the input apparatus.

The failure cause SQL narrowing processing part 905 next determines whether or not the count of pieces of SQL execution information extracted in Step S1913 is equal to or less than a given count (Step S1914). When the extracted pieces are not equal to or less than the given count (Step S1914: FALSE), this constitutes an error (Step S1915) and requires a re-investigation of application programs. When the extracted pieces are equal to or less than the given count (Step S1914: TRUE), on the other hand, the failure cause SQL narrowing processing part 905 moves on to the delayed SQL identifying processing 1902.

In the delayed SQL identifying processing 1902, the failure cause SQL narrowing processing part 905 collects pieces of SQL execution information in a given period of time that includes a normal time slot (Step S1921). The given period of time that includes a normal time slot is the same as in Step S1821 of FIG. 18.

From the pieces of SQL execution information in the given period of time which have been collected in Step S1921, the failure cause SQL narrowing processing part 905 extracts pieces of SQL execution information that have the same SQL_IDs as those of the pieces of SQL execution information extracted in Step S1913 (Step S1922).

Thereafter, the SQL performance trend displaying processing part 906 generates an execution performance trend for each SQL_ID extracted in Step S1922, and displays the trend on the screen (Step S1931). Specifically, the SQL performance trend displaying processing part 906 displays SQL_ID-by-SQL_ID execution performance trends by, for example, calculating an average value of the execution time for pieces of SQL execution information that have the same SQL_ID, creating a graph that shows changes with time of the execution time, and displaying SQL_ID-by-SQL_ID execution performance trends that include the average value and the graph on the screen.

<Example of a Problem Investigation Screen>

FIGS. 20 to 23 are explanatory diagrams illustrating an example of a problem investigation screen. The problem investigation screen 2000 is a monitoring screen displayed on the Web browser 270 of the terminal 207 through processing executed by the screen displaying processing part 901, access performance trend displaying processing part 904, and SQL performance trend displaying processing part 906 of the service monitoring manager 240, which is installed in the service monitoring server 204.

Figure 20:
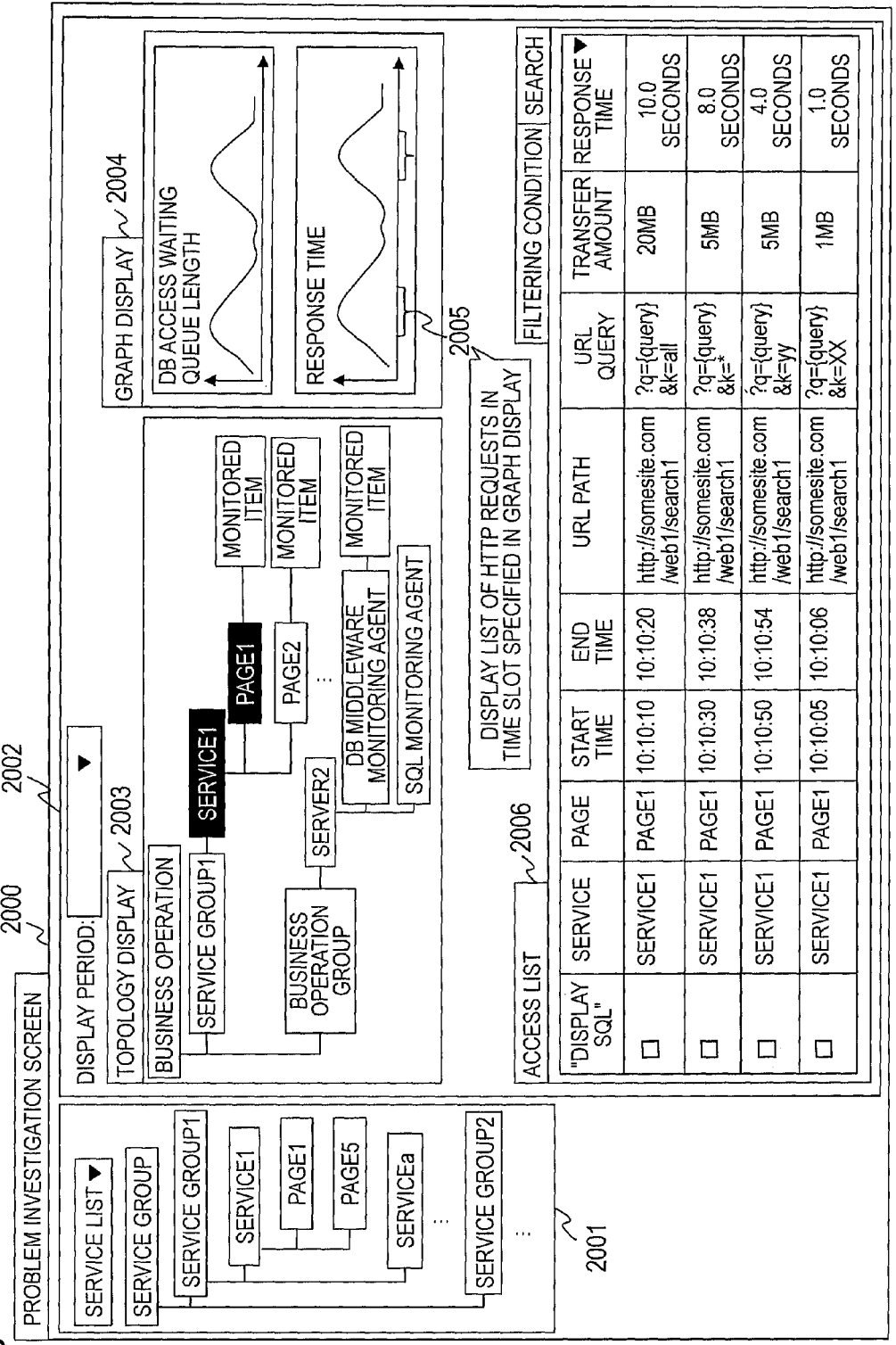
FIG. 20 is explanatory diagrams illustrating 1st example of a problem investigation screen.

The problem investigation screen 2000 of FIG. 20 is an example of the screen in which a list of HTTP requests in a delay time slot where a performance failure has occurred is displayed as a result of monitoring services and the performance of their associated systems with respect to a baseline and detecting that the baseline has been exceeded.

To use the problem investigation screen 2000, a service group and services are specified on a service list display pane 2001, and "past 1 hour" is selected for a display period 2002. Then topology display 2003 shows the occurrences of events that are the results of monitoring the services in the business operation and system performance.

Graph display 2004 displays a trend graph of arbitrarily selected performance information. When a delay time slot 2005 where a performance failure has occurred is identified on a trend graph of the service response time in the graph display 2004 and an instruction to display a list of HTTP requests is issued, an access list 2006 displays a list of pieces of access details information in the delay time slot 2005 where the service performance failure has occurred.

For example, in Step S1811 of FIG. 18, the delayed access narrowing processing part 903 receives via the topology display the specification of the service name (URI) and page information (URL) of a service and a page where a service performance failure has occurred, and receives via the graph display 2004 the specification of the delay time slot 2005 where the service performance failure has occurred. Pieces of the delayed access details information 911 that satisfy specified conditions are thus obtained as the access list 2006.

Figure 21:
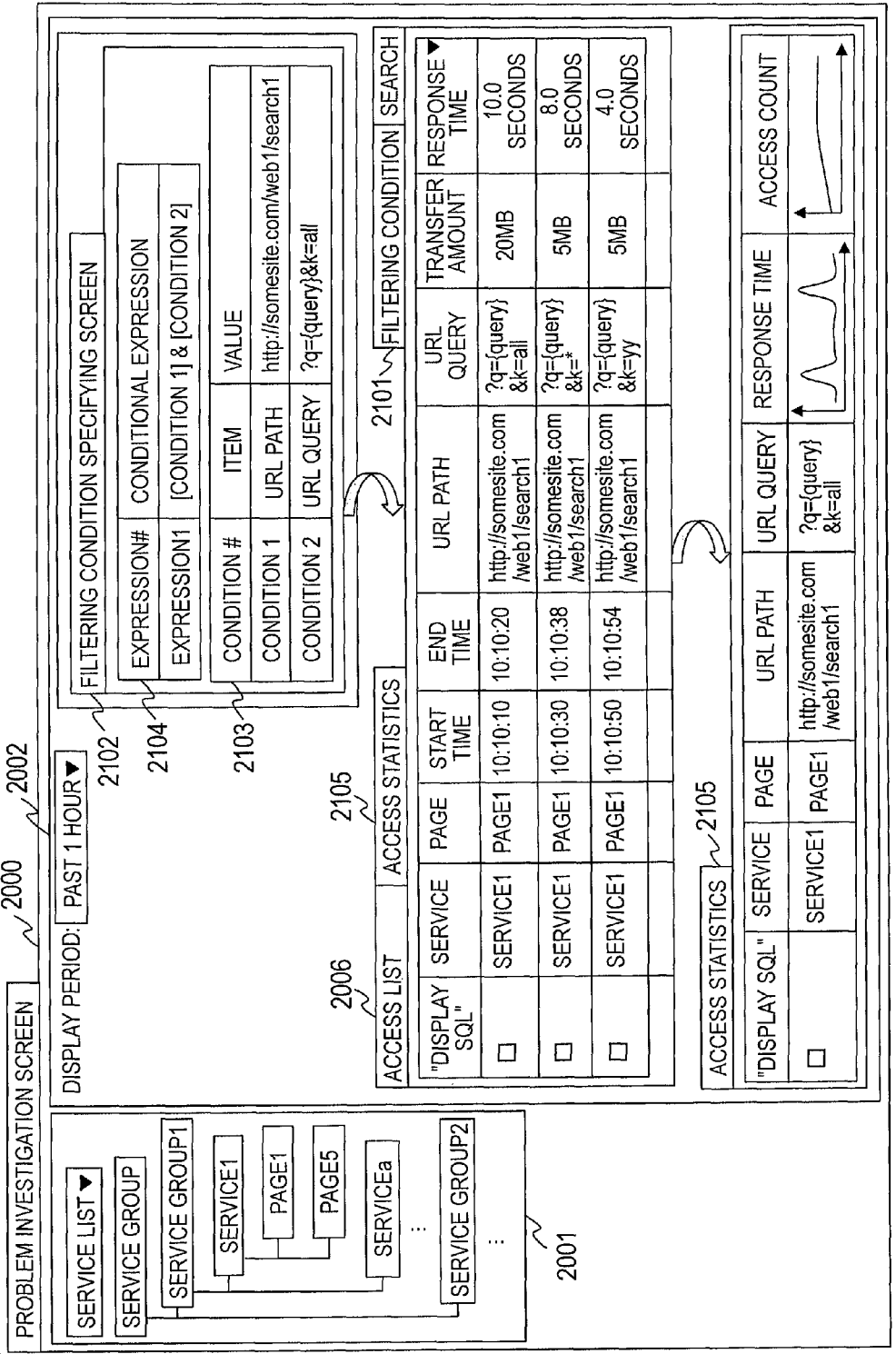
FIG. 21 is explanatory diagrams illustrating 2nd example of a problem investigation screen.

The problem investigation screen 2000 of FIG. 21 is an example of the screen in which a filtering condition specifying screen 2102 is displayed from the access list 2006 in order to set a delayed request group, the access list 2006 that lists requests belonging to the delayed request group is displayed, and access statistics 2105 are displayed from the access list 2006.

The delayed access narrowing processing part 903 displays pieces of protracted access details information in the access list 2006 and, as illustrated in Step S1822 of FIG. 18, searches for letter strings that are common in URL paths and URL queries of the pieces of access details information.

The filtering condition specifying screen 2102 is displayed by clicking on a filtering condition 2101. When a condition 2103 and a conditional expression 2104 are specified on the filtering condition specifying screen 2102 in the manner illustrated in Step S1823 of FIG. 18, the access list 2006 displays a list of requests filtered by request groups as illustrated in Step S1824 of FIG. 18.

The access statistics 2105 that include a performance trend graph of access on the access list 2006 are displayed as illustrated in Step S1831 of FIG. 18 by clicking a tab for the access statistics 2105 which is by the side of a tab for the access list 2006. Trend graphs of the response time and the access count are displayed in the access statistics 2105. The response time graph is a graph in which a response time between the start time and end time of access represented by a record of the access list 2006 is plotted for each record. The access count graph is a graph in which the access count between the start time and end time of access represented by a record of the access list 2006 is plotted for each record.

Figure 22:
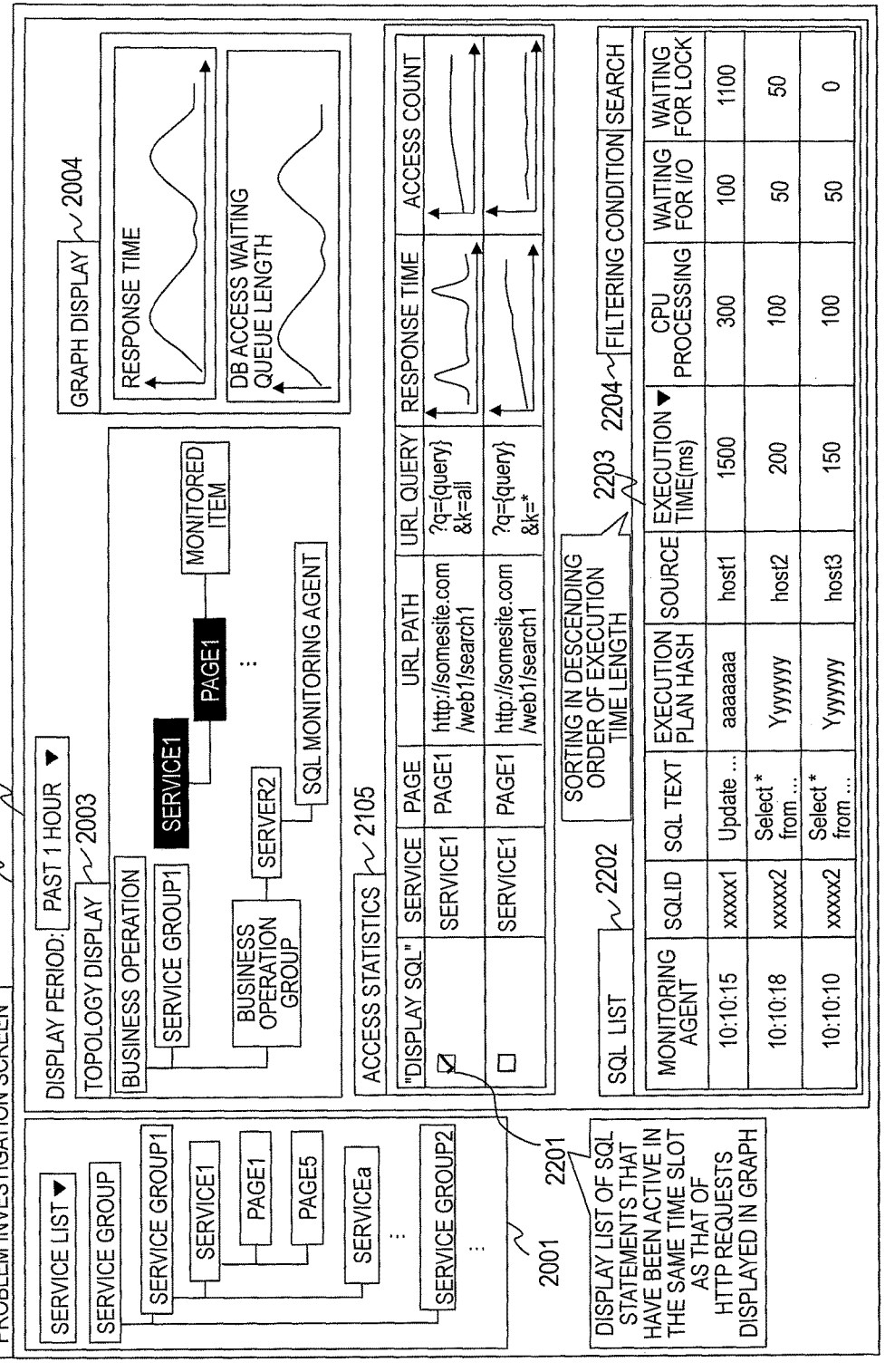
FIG. 22 is explanatory diagrams illustrating 3rd example of a problem investigation screen.

The problem investigation screen 2000 of FIG. 22 is an example of the screen in which a list of SQL statements that have been executed in the same time slot as that of access details information of a request group in the access statistics 2105 is displayed. For example, a service that corresponds to delayed access obtained in the access statistics 2105 of FIG. 21 is "service 1". The failure cause SQL narrowing processing part 905 therefore identifies, as a DB instance, "SQL monitoring agent" in "server 2" which belongs to a "business operation group" associated with "service group 1" to which "service 1" belongs.

The failure cause SQL narrowing processing part 905 executes selection 2201 to select service performance and request groups that have the same trend in the request group-by-request group trend graph display of the access statistics 2105 as illustrated in Step S1912 of FIG. 19. The failure cause SQL narrowing processing part 905 then displays an SQL list 2202 of SQL statements that have been executed in the time slot in question. The failure cause SQL narrowing processing part 905 executes sorting 2203 in which SQL statements on the SQL list 2202 are sorted by descending order of the length of the execution time, and uses a filtering condition 2204 to filter the SQL statements by their SQL_IDs.

Figure 23:
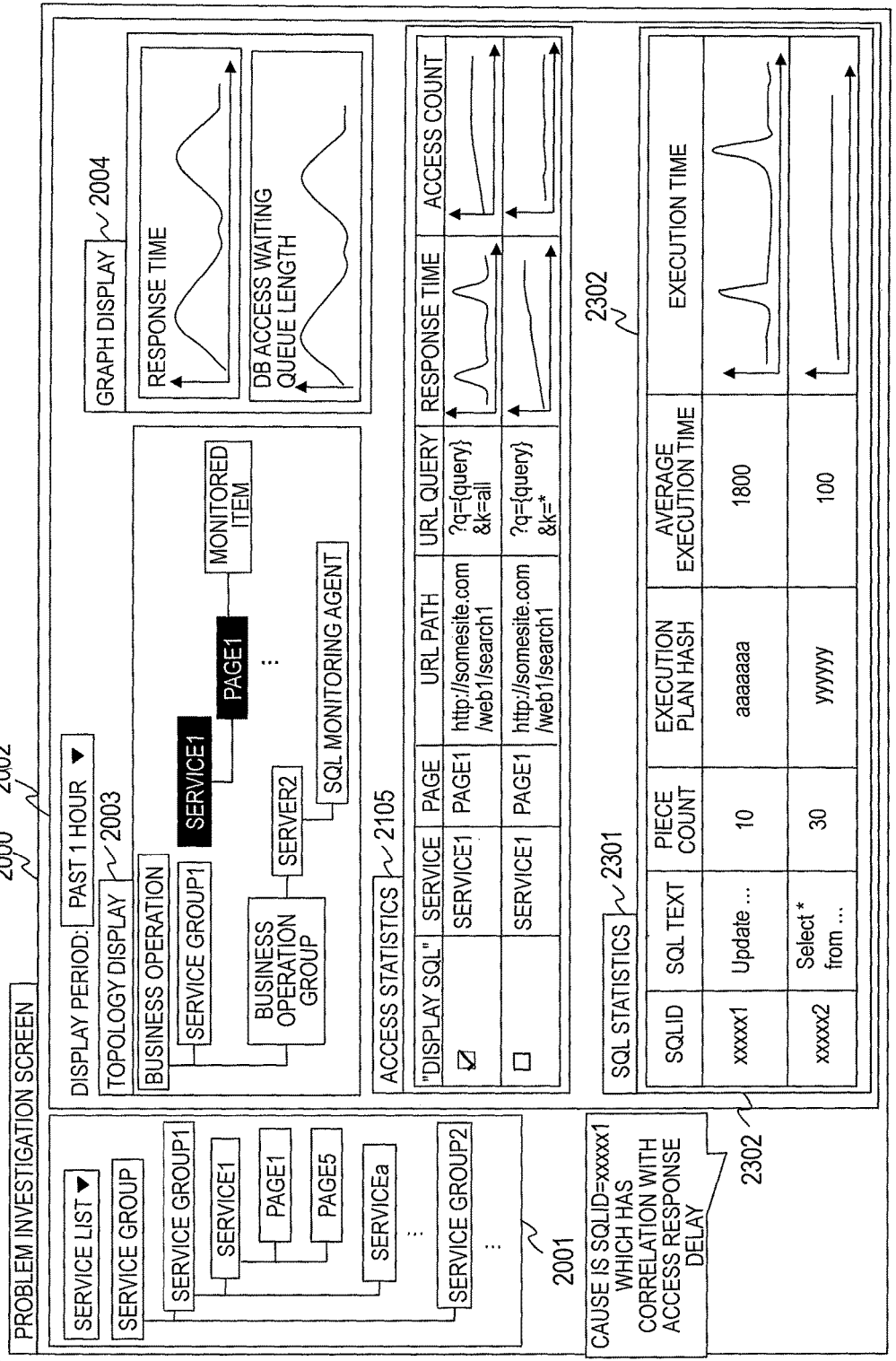
FIG. 23 are explanatory diagrams illustrating 4th example of a problem investigation screen.

The problem investigation screen 2000 of FIG. 23 is an example of the screen in which SQL statistics 2301 are displayed for particular SQL_IDs from the SQL list 2202 that are specified by the filtering condition 2204 of FIG. 22. The failure cause SQL narrowing processing part 905 displays SQL list information of SQL statements filtered by their SQL_IDs in an execution time trend graph for each SQL_ID, thereby displaying the SQL statistics 2302.

<Modification Example>

Figure 24:
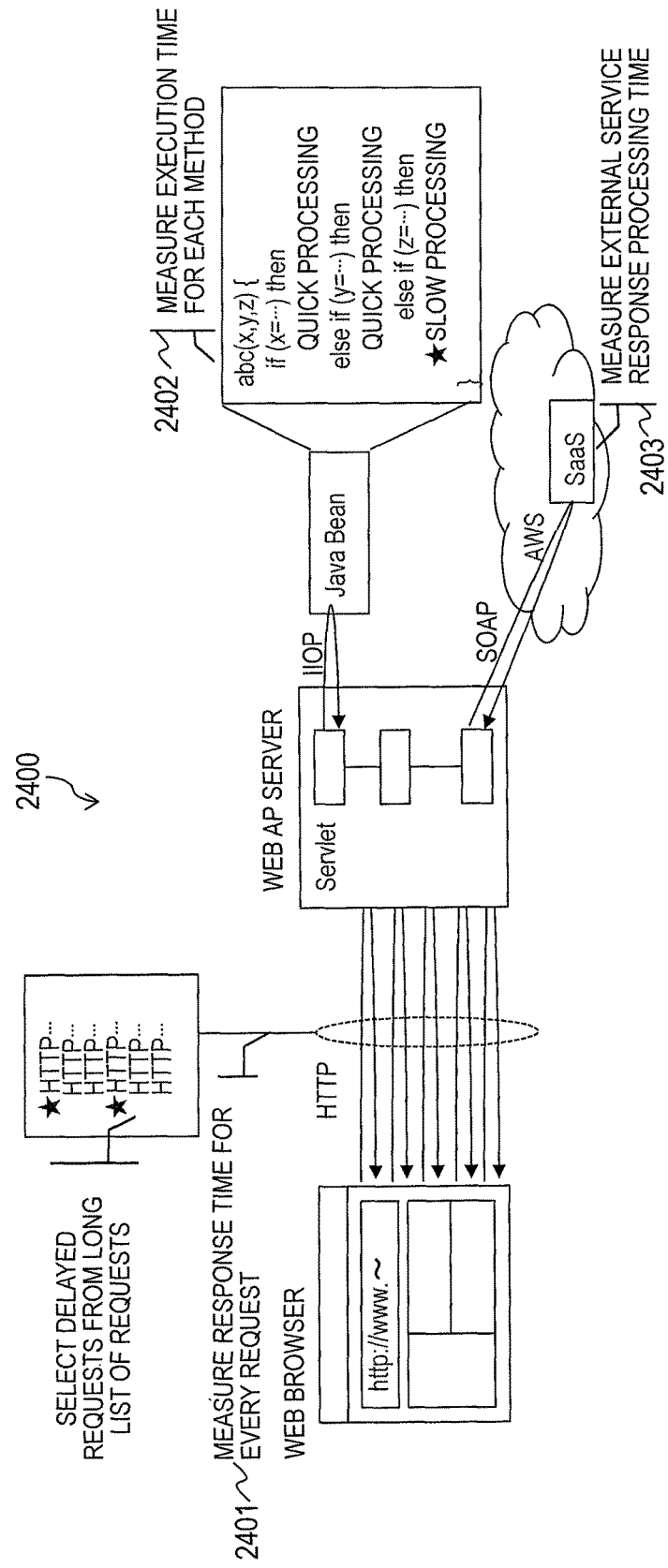
FIG. 24 is a schematic view of a monitoring system, which is a modification example of the monitoring system.

FIG. 24 is a schematic view of a monitoring system 2400, which is a modification example of the monitoring system 100. The monitoring system 2400 is for detecting a performance failure in a service that is used over the Web, investigating the cause of the failure, and identifying the cause. In this modification example, delayed requests are selected from a long list of requests and slow processing is narrowed down with the use of a statistical value of the execution time which is obtained for each method executed in JavaBeans, or an external service SaaS is used to narrow down services that are slow in service response time, without the trace analysis function.

The monitoring system 2400 accomplishes this by executing response time measuring processing 2401 for every request, identifying delayed requests in the same manner that is described in the embodiment, and identifying slow processing through processing time measuring processing 2402, which is executed for each method of JavaBeans for the same time slot as the time when the delayed requests are executed. Alternatively, the response time measuring processing 2401 is executed for every request, delayed requests are identified in the same manner that is described in the embodiment, and slow services are identified through response time measuring processing 2403 of external services using Software as a Service (SaaS) for the same time slot as the time when the delayed requests are executed.

In the modification example, the monitoring system 2400 detects a performance failure at an early stage of the failure before a widespread access delay involving many end users occurs, and investigates and identifies the cause of the failure without using the result of measuring the internal processing time in transactions. How to detect a performance failure early is described first.

The monitoring system 2400 first sorts actual user access response times for each Web page. Next, the service monitoring server 204 performs statistical processing in real time on monitoring results of the access response times sorted for each Web page to calculate an average response time, maximum response time, and minimum response time per unit time. An error event is issued when one of the statistical values of the response time exceeds a baseline, which is created based on past performance monitoring results.

By monitoring access response performance for each Web page in the manner described above, requests relevant to processing of the Web page are grouped and whether there is a performance failure or not is determined for each Web page separately.

How the cause of a failure is investigated and identified is described next. The monitoring system 2400 first obtains records of access history in a time slot where the performance failure has occurred that are relevant to web page access in question, and extracts protracted access from the obtained records of access history. The monitoring system 2400 searches the extracted history records of protracted access for letter strings common among URLs and queries of the extracted records, and creates a filtering condition for grouping together requests that have a common letter string in their URLs or queries.

The monitoring system 2400 obtains, from all records of access history in a given period of time that spans before and after the occurrence of the service performance failure, every piece of access information that is included in a request group with the use of the filtering condition, and displays response times of the pieces of access information in a trend graph. The monitoring system 2400 identifies a request response delay time slot from the response performance trend of the grouped requests, and obtains pieces of SQL execution information about SQL statements that are executed in the same time slot as the request response delay time slot identified.

The monitoring system 2400 extracts protracted SQL execution from the obtained pieces of SQL execution information, and displays a response performance trend for each SQL_ID. The response performance of the grouped requests and the SQL_ID-by-SQL_ID response performance are compared, and an SQL statement for which a correlation is found through the comparison is determined as an SQL statement that is the cause of the performance failure. Other than identifying an SQL statement that is the cause of a delayed request by checking against SQL execution times of processing of the Web AP server 211, a check against JavaBeans processing time may be used in the case where JavaBeans is used, or a check against service processing times may be used in the case where an external service SaaS is used, to identify processing that is the cause of a delayed request.

As has been described, according to the embodiment, an anomaly is detected before many end users experience a service performance failure, and then the cause of the anomaly is traced efficiently without needing to install a transaction processing time measuring function in a management target server. Consequently, an action can be taken early and services high in performance and reliability can be provided to end users.

This invention has been described in detail so far with reference to the accompanying drawings, but this invention is not limited to those specific configurations described above, and includes various changes and equivalent components within the gist of the scope of claims appended.

What is claimed is:

1. A monitoring apparatus for monitoring a system, comprising:
    a processor for executing a program;
    a memory for storing the program that is executed by the processor; and
    an interface for controlling communication between the monitoring apparatus and the system,
    wherein the processor is configured to execute:
        obtaining pieces of information about access in a first time slot by specifying the first time slot including access to a first apparatus in the system where a response time is long;
        selecting a feature common to the access in the first time slot from the pieces of information about the access in the first time slot that have been obtained at the obtaining;
        first extracting from pieces of information about access in a given period of time, pieces of information about access that has the common feature selected at the selecting as a feature common to the access in the first time slot; and
        first generating a first graph which shows changes with time in response time, based on the pieces of information about the access having the feature common to the access in the first time slot that have been extracted at the first extracting.

2. The monitoring apparatus according to claim 1, wherein the processor is further configured to:
    obtain pieces of information about access in the first time slot that has a long response time at the obtaining;
    select a feature common to the access that has a long response time from the pieces of information about the access that has a long response time at the selecting;
    extract from pieces of information about access in the given period of time, pieces of information about access that has the common feature selected at the selecting as a feature common to the access that has a long response time at first extracting; and
    generate the first graph which shows changes with time in response time based on the pieces of information that have been extracted at the first extracting as pieces of information about the access having the feature common to the access that has a long response time at first generating.

3. The monitoring apparatus according to claim 1, wherein the given period of time comprises a period in which the first apparatus is free from experiencing a failure.

4. The monitoring apparatus according to claim 1, wherein the processor is further configured to execute:
    second extracting pieces of information about requests in a second time slot from pieces of information about requests that have been processed by a second apparatus in the system on demand from the first apparatus, by specifying, on the first graph generated at the first generating, the second time slot including access having a long response time;
    third extracting, from pieces of information about requests in the given period of time, pieces of information about the same requests as those of the pieces of information about requests in the second time slot that at the second extracting; and
    second generating, for each request, a second graph which shows changes with time in execution time required for the request processing in the second apparatus, based on the pieces of information about requests that have been extracted at the third extracting.

5. The monitoring apparatus according to claim 4, wherein the processor is further configured to extract, at the second extracting, pieces of information about requests in the second time slot that have a long execution time from the pieces of information about requests that have been processed by the second apparatus on demand from the first apparatus.

6. The monitoring apparatus according to claim 4, wherein the given period of time comprises a period in which the second apparatus is free from experiencing a failure.

7. The monitoring apparatus according to claim 1, wherein the processor is further configured to obtain, at the obtaining, pieces of information about access in the first time slot by specifying the first time slot including access to the first apparatus where the response time has exceeded a baseline.

8. A monitoring method, which is to be executed by a monitoring apparatus for monitoring a system,
the monitoring apparatus comprising:
   a processor for executing a program;
   a memory for storing the program that is executed by the processor; and
   an interface for controlling communication between the monitoring apparatus and the system,
the monitoring method comprising:
   obtaining, by the processor, pieces of information about access in a first time slot by specifying the first time slot including access to a first apparatus in the system where a response time is long;
   selecting, by the processor, a feature common to the access in the first time slot from the pieces of information about the access in the first time slot that have been obtained at the obtaining;
   first extracting, by the processor, from pieces of information about access in a given period of time, pieces of information about access that has the common feature selected at the selecting as a feature common to the access in the first time slot; and
   first generating, by the processor, a first graph which shows changes with time in response time, based on the pieces of information about the access having the feature common to the access in the first time slot that have been extracted at the first extracting.

9. A non-transitory recording medium having stored thereon a program to be executed by a processor, the non-transitory recording medium being readable by the processor, the non-transitory recording medium having recorded thereon a monitoring program for controlling the processor to execute:
   obtaining pieces of information about access in a first time slot by specifying the first time slot including access to a first apparatus in the system where a response time is long;
   selecting a feature common to the access in the first time slot from the pieces of information about the access in the first time slot at the obtaining;
   first extracting, from pieces of information about access in a given period of time, pieces of information about access that has the common feature selected at the selecting as a feature common to the access in the first time slot; and
   first generating a first graph which shows changes with time in response time, based on the pieces of information about the access having the feature common to the access in the first time slot that have been extracted at the first extracting.

* * * * *